US012404436B2

(12) United States Patent
Sezukuri et al.

(10) Patent No.: US 12,404,436 B2
(45) Date of Patent: Sep. 2, 2025

(54) LATENT HEAT STORAGE MATERIAL, COLD STORAGE TOOL, DISTRIBUTION PACKING CONTAINER, AND COLD STORAGE TOOL FOR FOOD

(71) Applicant: SHARP KABUSHIKI KAISHA, Sakai (JP)

(72) Inventors: Kyohei Sezukuri, Sakai (JP); Katsuya Kido, Sakai (JP); Yusuke Ikeda, Sakai (JP); Masakazu Kamura, Sakai (JP); Yuka Utsumi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 199 days.

(21) Appl. No.: 18/265,152

(22) PCT Filed: Nov. 29, 2021

(86) PCT No.: PCT/JP2021/043512
§ 371 (c)(1),
(2) Date: Jun. 2, 2023

(87) PCT Pub. No.: WO2022/118765
PCT Pub. Date: Jun. 9, 2022

(65) Prior Publication Data
US 2024/0026200 A1 Jan. 25, 2024

(30) Foreign Application Priority Data
Dec. 4, 2020 (JP) ................................ 2020-202087

(51) Int. Cl.
*C09K 5/06* (2006.01)
*F25D 3/08* (2006.01)

(52) U.S. Cl.
CPC ............... *C09K 5/066* (2013.01); *F25D 3/08* (2013.01); *F25D 2303/08222* (2013.01)

(58) Field of Classification Search
CPC .. C09K 5/066; C09K 5/06; F25D 3/08; F25D 2303/08222; F25D 2303/085; F25D 3/04; Y02E 60/14
See application file for complete search history.

(56) References Cited

U.S. PATENT DOCUMENTS 4,081,256 A * 3/1978 Donnelly .................. F25D 5/02
62/4
2017/0107414 A1 4/2017 Machida et al.
(Continued)

FOREIGN PATENT DOCUMENTS

JP    S59-170179 A    9/1984
JP    H0665560 A    3/1994
(Continued)

*Primary Examiner* — Jerry-Daryl Fletcher
*Assistant Examiner* — Dario Antonio Deleon
(74) *Attorney, Agent, or Firm* — ScienBiziP, P.C.

(57) ABSTRACT

Provided is a latent heat storage material capable of keeping an object to be refrigerated, such as frozen food or ice cream, cold at a temperature of −20° C. or lower for a long period of time, and of reducing power consumption required at a time of solidification. The latent heat storage material contains 5 to 21 parts by weight of ammonium chloride, 2 to 13 parts by weight of potassium chloride, 5 to 23 parts by weight of urea, and 43 to 88 parts by weight of water. The total of the ammonium chloride, the potassium chloride, the urea, and the water is 100 parts by weight, and the latent heat storage material has a main melting point in a range from −20° C. to −23° C.

8 Claims, 16 Drawing Sheets

| | | EXAMPLES | | | | | | | | | | COMPARATIVE EXAMPLES | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| MAIN AGENT | AMMONIUM CHLORIDE | 13.5 | 12 | 15 | 10 | 20 | 13.5 | 13.5 | 13.5 | 13.5 | 13.5 | - | 4 | 22 |
| | POTASSIUM CHLORIDE | 6 | 5 | 8 | 4 | 10 | 6 | 6 | 6 | 6 | 6 | - | 1 | 14 |
| | SODIUM CHLORIDE | - | - | - | - | - | - | - | - | - | - | 23 | - | - |
| | UREA | 10.5 | 9 | 13 | 6 | 18 | 10.5 | 10.5 | 10.5 | 10.5 | 10.5 | - | 4 | 24 |
| | WATER | 70 | 74 | 64 | 80 | 52 | 70 | 70 | 70 | 70 | 70 | 77 | 91 | 40 |
| SUPERCOOLING INHIBITOR | $NH_4Al(SO_4)_2 \cdot 12H_2O$ | - | - | - | - | - | 5 | - | - | - | - | - | - | - |
| | $KAl(SO_4)_2 \cdot 12H_2O$ | - | - | - | - | - | - | 5 | - | - | - | - | - | - |
| | CALCIUM CARBONATE | - | - | - | - | - | - | - | 1 | - | - | - | - | - |
| | ALMINUM OXIDE | - | - | - | - | - | - | - | - | 1 | - | - | - | - |
| | ACTIVATED CARBON | - | - | - | - | - | - | - | - | - | 1 | - | - | - |
| CHARACTERISTICS | LATENT HEAT VALUE (J/g) | 278 | 288 | 273 | 292 | 238 | 256 | 255 | 275 | 275 | 275 | 212 | 71 | 131 |
| | MELTING START TEMPERATURE (°C) | -22.5 | -22.2 | -22.2 | -22.2 | -22.2 | -24.0 | -24.2 | -22.5 | -22.5 | -22.5 | -20.8 | -22.8 | -24.2 |
| | MAIN MELTING TEMPERATURE (°C) | -21.2 | -21.5 | -21.5 | -20.9 | -20.9 | -21.8 | -21.8 | -20.9 | -20.9 | -20.9 | -20.4 | -21.4 | -23.1 |
| | COLD STORAGE TIME PERIOD (h) | 1.9 | 1.7 | 1.8 | 1.6 | 1.4 | 1.5 | 1.5 | 1.9 | 1.9 | 1.9 | 1.4 | 0.9 | 0.8 |

(56) References Cited

U.S. PATENT DOCUMENTS

| | | | |
|---|---|---|---|
| 2020/0248057 | A1 | 8/2020 | Sezukuri et al. |
| 2021/0214599 | A1 | 7/2021 | Motonami et al. |

FOREIGN PATENT DOCUMENTS

| | | | |
|---|---|---|---|
| JP | 2017-036350 | A | 2/2017 |
| JP | 2017-078163 | A | 4/2017 |
| WO | 2019/026820 | A1 | 2/2019 |
| WO | 2019/235468 | A1 | 12/2019 |

\* cited by examiner

| | | Examples | | | | | | | | | | Comparative Examples | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Main Agent | Ammonium Chloride | 13.5 | 12 | 15 | 10 | 20 | 13.5 | 13.5 | 13.5 | 13.5 | 13.5 | - | 4 | 22 |
| | Potassium Chloride | 6 | 5 | 8 | 4 | 10 | 6 | 6 | 6 | 6 | 6 | - | 1 | 14 |
| | Sodium Chloride | - | - | - | - | - | - | - | - | - | - | 23 | - | - |
| | Urea | 10.5 | 9 | 13 | 6 | 18 | 10.5 | 10.5 | 10.5 | 10.5 | 10.5 | - | 4 | 24 |
| | Water | 70 | 74 | 64 | 80 | 52 | 70 | 70 | 70 | 70 | 70 | 77 | 91 | 40 |
| Supercooling Inhibitor | $NH_4Al(SO_4)_2 \cdot 12H_2O$ | - | - | - | - | - | 5 | - | - | - | - | - | - | - |
| | $KAl(SO_4)_2 \cdot 12H_2O$ | - | - | - | - | - | - | 5 | - | - | - | - | - | - |
| | Calcium Carbonate | - | - | - | - | - | - | - | 1 | - | - | - | - | - |
| | Aluminum Oxide | - | - | - | - | - | - | - | - | 1 | - | - | - | - |
| | Activated Carbon | - | - | - | - | - | - | - | - | - | 1 | - | - | - |
| Characteristics | Latent Heat Value (J/g) | 278 | 288 | 273 | 292 | 238 | 256 | 255 | 275 | 275 | 275 | 212 | 71 | 131 |
| | Melting Start Temperature (°C) | -22.5 | -22.2 | -22.2 | -22.2 | -22.2 | -24.0 | -24.2 | -22.5 | -22.5 | -22.5 | -20.8 | -22.8 | -24.2 |
| | Main Melting Temperature (°C) | -21.2 | -21.5 | -21.5 | -20.9 | -20.9 | -21.8 | -21.8 | -20.9 | -20.9 | -20.9 | -20.4 | -21.4 | -23.1 |
| | Cold Storage Time Period (h) | 1.9 | 1.7 | 1.8 | 1.6 | 1.4 | 1.5 | 1.5 | 1.9 | 1.9 | 1.9 | 1.4 | 0.9 | 0.8 |

FIG. 1

LATENT HEAT STORAGE MATERIAL, COLD STORAGE TOOL, DISTRIBUTION PACKING CONTAINER, AND COLD STORAGE TOOL FOR FOOD

TECHNICAL FIELD

The present disclosure relates to a latent heat storage material, a cold storage tool, a distribution packing container, and a cold storage tool for food. The present application claims priority based on JP 2020-202087 filed in Japan on Dec. 4, 2020, the content of which is hereby incorporated by reference into this application.

BACKGROUND ART

When frozen food or ice cream is transported, in many cases, the frozen food or the ice cream is packed in a distribution container, and the distribution container in which the frozen food or the ice cream is packed is transported.

In order to maintain the quality of the frozen food or the ice cream when the frozen food or the ice cream is transported, it is necessary to keep the frozen food or the ice cream cold at least below freezing point, and the frozen food is preferably kept at $-10°$ C. or lower, $-15°$ C. or lower, or $-18°$ C. or lower respectively depending on the type of the frozen food. On the other hand, for maintaining the quality of the ice cream, it is desirable to maintain the temperature at $-20°$ C. or lower, which is lower than the temperature for the frozen food, because some of the solidification components of the ice cream melt even at $-18°$ C. However, for the transportation of the frozen food, dry ice has been used regardless of the temperature required.

In recent years, the supply of liquefied carbon dioxide, which is a raw material of the dry ice, has become scarce, particularly in summer. The demands for liquefied carbon dioxide gas are diverse, and it is socially natural that the priority should be given to supplying life-threatening medical care. Thus, in the distribution field, a latent heat storage material having a melting point around $-25°$ C. are increasingly being applied as an alternative to dry ice.

A cold storage agent described in PTL 1 contains a water-soluble compound having a freezing-point depression effect, and water (paragraph 0006). As the water-soluble compound having the freezing-point depression effect, an inorganic salt of a monovalent cation and urea are used in combination (paragraph 0042).

CITATION LIST

Patent Literature

PTL 1: JP H6-65560 A

SUMMARY

Technical Problem

The latent heat storage material is required to be solidified before use. The latent heat storage material having the melting point around $-25°$ C., which has been mainly used as a latent heat storage material that replaces dry ice, requires a freezer compartment having a set temperature of $-35°$ C. or lower for solidification. In general, the lower the set temperature of the freezer compartment, the greater the amount of electric power consumed. Since a large amount of the latent heat storage material is required in distribution, energy consumption required for solidification becomes enormous. However, as described above, there are stages in the temperature required for frozen food and ice cream, and not all the foods require the latent heat storage material having the melting point around $-25°$ C. When a latent heat storage material having the melting point as close as possible to the required cold storage temperature is selected, that is, when a latent heat storage material having the melting point higher than the melting point of a latent heat storage material of related art is used, the set temperature required for the freezer compartment can be increased, and the power consumption can thus be suppressed.

A latent heat storage material having a melting point in a range from $-25°$ C. to $-20°$ C. is mainly composed of water, but a latent heat of a latent heat storage material having a melting point in a range from $-25°$ C. to $-20°$ C. is lower than 333 J/g of the latent heat obtained when the ice melts. For example, a latent heat storage material containing sodium chloride and water and having the eutectic composition has a melting point of approximately $-21°$ C., but the amount of latent heat thereof is low, which is approximately 210 J/g. Thus, the latent heat storage material having the melting point in a range from $-25°$ C. to $-20°$ C. generally has a short cold storage time period. In particular, when the melting point of the latent heat storage material is $-25°$ C., a difference between the temperature of the environment around the latent heat storage material and the melting point of the latent heat storage material becomes large, and the amount of heat absorbed per unit time by the latent heat storage material increases. Thus, the consumption of the latent heat storage material is likely to progress faster, and the cold storage time period of the latent heat storage material is further shortened.

The present disclosure has been made to solve the problem described above. An object of the present disclosure is to provide a latent heat storage material capable of keeping an object to be refrigerated, such as frozen food and ice cream, at a temperature of $-20°$ C. or lower for a long period of time, and of reducing power consumption required at a time of solidification.

Solution to Problem

A latent heat storage material according to a first embodiment of the present disclosure contains 5 to 21 parts by weight of ammonium chloride, 2 to 13 parts by weight of potassium chloride, 5 to 23 parts by weight of urea, and 43 to 88 parts by weight of water. A total of the ammonium chloride, the potassium chloride, the urea, and the water is 100 parts by weight, and the latent heat storage material has a main melting point in a range from $-20°$ C. to $-23°$ C.

A cold storage tool according to a second embodiment of the present disclosure includes the latent heat storage material according to the first embodiment of the present disclosure, and a cold storage tool main body configured to store the latent heat storage material in a liquid-tight manner.

A distribution packing container and a cold storage tool for food according to a third embodiment of the present disclosure includes the cold storage tool according to the second embodiment of the present disclosure.

A cold storage tool according to a fourth embodiment of the present disclosure includes the latent heat storage material according to the first embodiment of the present disclosure, and a cold storage tool main body including a plurality of storage portions and a plurality of joint portions.

A distribution packing container and a cold storage tool for food according to a fifth embodiment of the present disclosure includes the cold storage tool according to the fourth embodiment of the present disclosure.

A cold storage tool according to a sixth embodiment of the present disclosure includes the latent heat storage material according to the first embodiment of the present disclosure, and a cold storage tool main body including a plurality of storage portions and a plurality of joint portions.

A distribution packing container and a cold storage tool for food according to a seventh embodiment of the present disclosure includes the cold storage tool according to the sixth embodiment of the present disclosure.

Advantageous Effects

According to the present disclosure, it is possible to provide a latent heat storage material capable of keeping an object to be refrigerated, such as frozen food and ice cream, at a temperature of −20° C. or lower for a long period of time, and of reducing power consumption required at a time of solidification.

BRIEF DESCRIPTION OF DRAWINGS

FIG. 1 is a table showing compositions and the like of latent heat storage materials according to Examples and Comparative Examples.

DESCRIPTION OF EMBODIMENTS

Figure 2:
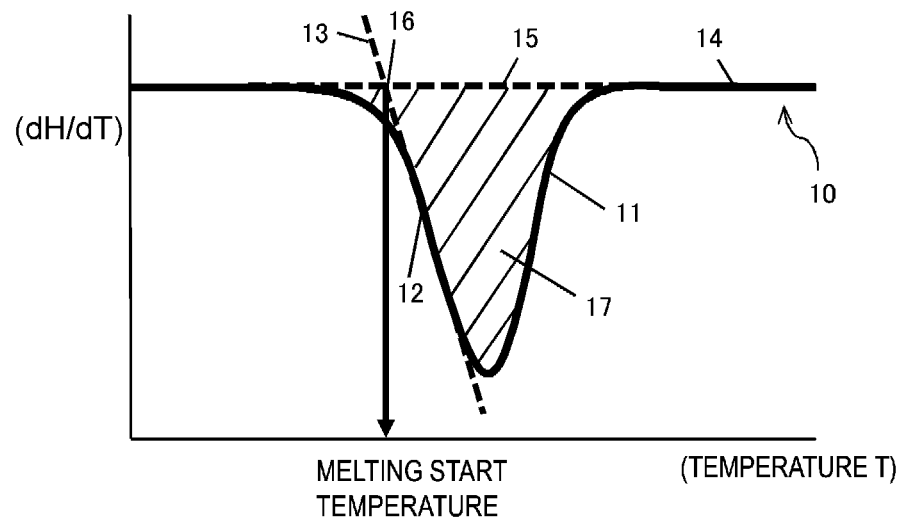
FIG. 2 is a diagram explaining a method for measuring melting start temperatures and amounts of latent heat of the latent heat storage materials according to Examples and Comparative Examples.

Embodiments of the present disclosure will be described below with reference to the drawings. In the drawings, identical or equivalent elements are given the same reference signs, and redundant descriptions thereof are omitted.

1 First Embodiment 1.1 Compositions of Latent Heat Storage Materials

A latent heat storage material according to a first embodiment is brought close to or into contact with an object to be refrigerated in a solidified state, and keeps the object to be refrigerated at a temperature near the main melting point thereof. Until the latent heat storage material completely melts, the latent heat storage material continues to keep the object to be refrigerated cold at the temperature near the main melting point of the latent heat storage material.

The latent heat storage material according to the first embodiment contains 5 to 21 parts by weight of ammonium chloride, 2 to 13 parts by weight of potassium chloride, 5 to 23 parts by weight of urea, and 43 to 88 parts by weight of water. Preferably, the latent heat storage material contains 12 to 15 parts by weight of ammonium chloride, 5 to 8 parts by weight of potassium chloride, 9 to 13 parts by weight of urea, and 64 to 74 parts by weight of water. The total of ammonium chloride, potassium chloride, urea, and water is 100 parts by weight.

By having a composition within the range described above, the latent heat storage material according to the first embodiment has a composition close to the eutectic composition. Thus, in a liquid state, the latent heat storage material is composed of a mixed aqueous solution of ammonium chloride, potassium chloride, and urea, but in a solid state, it is mainly composed of a eutectic crystal of ammonium chloride, potassium chloride, urea, and ice. Thus, when the latent heat storage material is solidified, the eutectic crystal of ammonium chloride, potassium chloride, urea, and ice is mainly formed. When the latent heat storage material has a composition within the desirable range described above, solidification components other than the eutectic crystal are hardly formed.

The eutectic crystal of ammonium chloride and ice has the eutectic point at approximately $-15°$ C. The eutectic crystal of potassium chloride and ice has the eutectic point at approximately $-11°$ C. The eutectic crystal of urea and ice has the eutectic point at approximately $-12°$ C. On the other hand, it was found that the eutectic crystal of ammonium chloride, potassium chloride, urea, and ice had the eutectic point at approximately $-22°$ C., which is lower than the eutectic point of any of the eutectic crystals described above. Ammonium chloride and potassium chloride, which are ionic substances, are dissociated into cations (ammonium ions, potassium ions) and anions (chloride ions) by being dissolved in water. With ammonium chloride and potassium chloride, since the anions thereof are both chloride ions, different inorganic salts are not formed from the cations and the anions dissociated from the ammonium chloride and the potassium chloride, respectively. However, if other ionic substances whose anions are different from the chloride ions are contained, different inorganic salts are formed between cations and anions dissociated from the other ionic substances, and the formation of the eutectic crystal of ammonium chloride, potassium chloride, urea, and ice may be inhibited. However, the urea, which is a molecular substance, is hardly dissociated into ions, and thus other substances are unlikely to be generated. Consequently, by forming only the eutectic crystal of ammonium chloride, potassium chloride, urea, and ice, a single eutectic point is obtained at $-22°$ C. Thus, by having a composition close to the eutectic composition, the latent heat storage material according to the first embodiment has the main melting point close to $-22°$ C., and more specifically, has the main melting point in a range from $-20°$ C. to $-23°$ C. Thus, the latent heat storage material can keep the object to be refrigerated at a temperature of $-20°$ C. or lower.

The latent heat storage material according to the first embodiment has a main melting point of $-20°$ C. to $-23°$ C. Thus, a difference between the temperature of the environment around the latent heat storage material and the main melting point of the latent heat storage material is smaller than that of a heat storage material having the melting point of $-25°$ C. Thus, an amount of heat absorbed per unit time by the latent heat storage material when the latent heat storage material melts is small. Since the latent heat storage material has the composition close to the eutectic composition of the eutectic crystal formed from ammonium chloride, potassium chloride, urea, and ice, the latent heat storage material has a large amount of latent heat. Consequently, the latent heat storage material has a long cold storage time period.

However, in a case in which the latent heat storage material has a composition outside the range described above, the amount of solidification components other than the eutectic crystal of ammonium chloride, potassium chloride, urea, and ice, which are formed when the latent heat storage material is caused to solidify, increases. Thus, it becomes difficult to obtain a latent heat storage material having the main melting point of $-20°$ C. to $-23°$ C. and having a large amount of latent heat. For example, when the amount of ammonium chloride contained in the latent heat storage material is less than 5 parts by weight, when the amount of potassium chloride contained in the latent heat storage material is less than 2 parts by weight, and when the amount of urea contained in the latent heat storage material is less than 9 parts by weight, only a latent heat storage material having an amount of latent heat half or less than that of the eutectic composition is obtained. That is, the cold storage time period is significantly shortened. When the amount of ammonium chloride contained in the latent heat storage material is more than 21 parts by weight, when the amount of potassium chloride contained in the latent heat storage material is more than 13 parts by weight, and when the amount of urea contained in the latent heat storage material is more than 23 parts by weight, only a latent heat storage material having a small amount of latent heat and having a main melting point lower than $-23°$ C. is obtained. When the main melting point is lower than $-23°$ C., a difference between the temperature of the environment around the latent heat storage material and the main melting point of the latent heat storage material is larger than that of the latent heat storage material having the main melting point in the range from $-20°$ C. to $-23°$ C., and thus the amount of heat absorbed per unit time becomes large. That is, even if the latent heat storage material having the main melting point lower than $-23°$ C. and the latent heat storage material having the main melting point in the range from $-20°$ C. to $-23°$ C. both have the same amount of latent heat, the latent heat storage material having the main melting point lower than $-23°$ C. has a shorter cold storage time period.

The latent heat storage material according to the first embodiment preferably contains a supercooling inhibitor. The supercooling inhibitor is dissolved or dispersed in water. By containing the supercooling inhibitor, when the latent heat storage material solidifies, a phenomenon in which the latent heat storage material is supercooled, and the solidification start temperature is lowered can be suppressed. In a case in which the supercooling inhibitor is dissolved in water, the solubility of the supercooling inhibitor decreases and the supercooling inhibitor is saturated while the temperature decreases as the latent heat storage material solidifies, and a solid of the supercooling inhibitor is deposited. As a result, the suppression effect described above is exhibited. Thus, the latent heat storage material can be caused to solidify, for example, in a widely used freezer compartment of $-25°$ C.

The supercooling inhibitor preferably contains at least one selected from the group consisting of ammonium aluminum sulfate dodecahydrate, potassium aluminum sulfate dodecahydrate, calcium carbonate, aluminum oxide, and activated carbon.

The weight of the supercooling inhibitor is preferably 0.1 parts by weight to 10 parts by weight with respect to 100 parts by weight of the total of ammonium chloride, potassium chloride, urea, and water.

The latent heat storage material according to the first embodiment may contain a component other than the components described above. The component other than the components described above contains, for example, at least one selected from the group consisting of a thickener, an antibacterial agent, and a dye.

Examples and Comparative Examples of First Embodiment Latent heat storage materials according to Examples and Comparative Examples were each prepared by mixing, with a supercooling inhibitor, a main agent containing water, an inorganic salt (ammonium chloride, potassium chloride, sodium chloride, or the like, for example), urea, and the like in weight ratios shown in the table of FIG. 1, and dissolving the mixture. Note that the preparations were made so that the total amount of the main agent was 100 parts by weight.

FIG. 1 also shows the results of characteristics of the latent heat storage materials according to Examples and Comparative Examples, such as the latent heat value, the melting start temperature, the main melting point, and the cold storage time period.

FIG. 2 is a diagram showing a method for measuring the melting start temperatures and the amounts of latent heat of the latent heat storage materials according to the first embodiment.

When the melting start temperature and the amount of latent heat of the latent heat storage material according to the first embodiment are measured, as shown in FIG. 2, a differential scanning calorimetry (DSC) curve 10 is obtained by performing DSC with respect to the latent heat storage material. The horizontal axis represents the temperature (T), and the vertical axis represents melting enthalpy per unit temperature (dH/dT). The temperature at an intersection point 16, between a straight line 13 obtained by linearly extrapolating a low temperature side 12 of a melting peak 11 included in the DSC curve 10, and a straight line 15 obtained by linearly extrapolating a base line 14 of the low temperature side included in the DSC curve 10, is defined as the melting start temperature. A value obtained by dividing an area of a latent heat region 17 surrounded by the melting peak 11 and the straight line 15, by the weight of the latent heat storage material is defined as the amount of latent heat.

The melting characteristics of the latent heat storage materials according to Examples and Comparative Examples were evaluated. A thermocouple was inserted into 40 g of each of the latent heat storage materials according to Examples and Comparative Examples, and the temperature was measured at the time at which each of the latent heat storage materials melted. Specifically, after each of the latent heat storage materials was caused to solidify at −35° C., the temperature was raised at a rate of 0.25° C. per minute, and changes over time in the temperature of each of the latent heat storage materials were measured at one minute intervals, using the thermocouple.

Note that the main melting points and the cold storage time periods were obtained from the measurement results of the melting characteristics described above.

Figure 3:
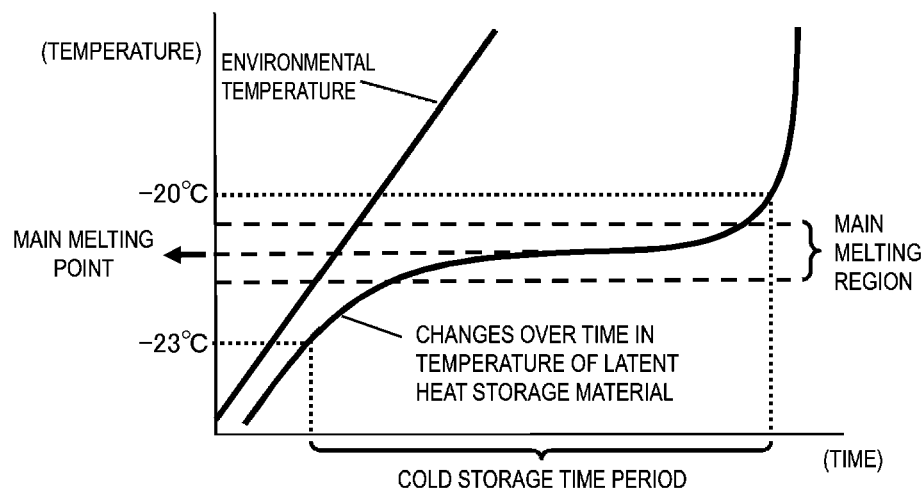
FIG. 3 is a diagram explaining a method for determining main melting points and cold storage time periods of the latent heat storage materials according to Examples and Comparative Examples.

FIG. 3 is a diagram showing a method for determining the main melting point and the cold storage time period of the latent heat storage material according to the first embodiment.

In the changes over time in the temperature of the latent heat storage material shown in FIG. 3, when, for each of the measurement points obtained at one minute intervals, an average value is calculated between a rate of temperature change of the latent heat storage material between the measurement point immediately prior to the current measurement point and the current measurement point and a rate of temperature change of the latent heat storage material between the measurement point immediately subsequent to the current measurement point and the current measurement point, of sections over which the measurement points are consecutive at which the above-described average rate is less than 0.15° C. per minute, which is less than 0.25° C. per minute that is the temperature increase rate of the environmental temperature, a section over which the measurement points are consecutive for the longest period of time is the main melting region. The lowest temperature of the main melting region is the temperature of the latent heat storage material at the first measurement point of the main melting region. The maximum temperature of the main melting region is the temperature of the latent heat storage material at the last measurement point of the main melting region. An intermediate value between the lowest temperature of the main melting region and the highest temperature of the main melting region is the main melting point.

The cold storage time period is a time period during which the temperature of the latent heat storage material is in a range from −20° C. to −23° C., and is a time period during which the latent heat storage material can be used to keep the temperature in the above-described temperature range.

Figure 4:
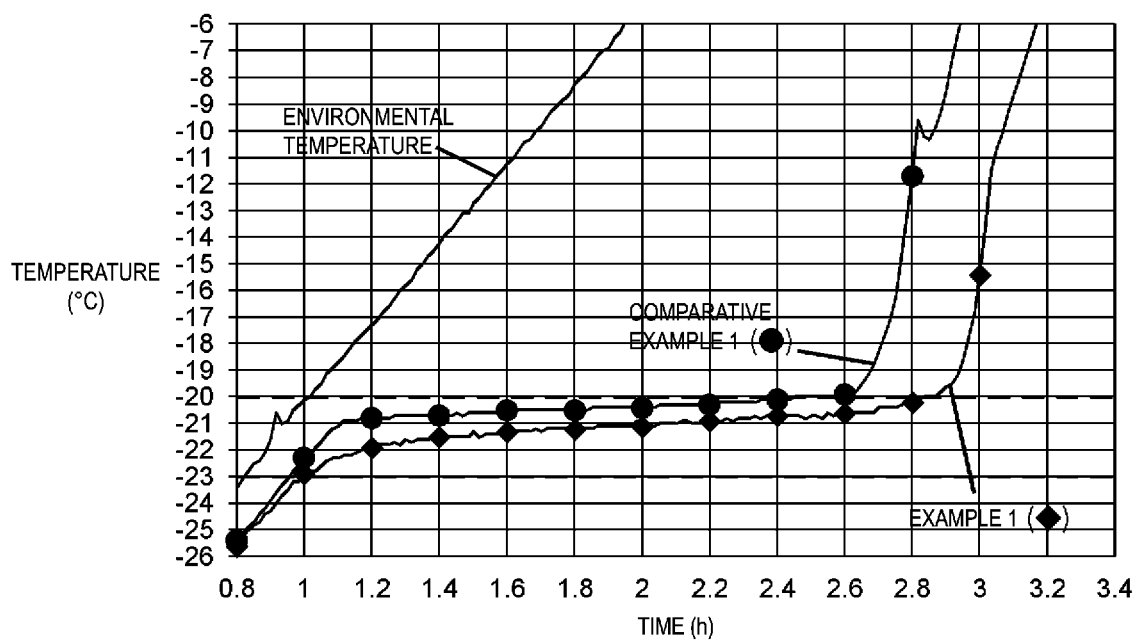
FIG. 4 is a diagram showing melting behaviors of the latent heat storage materials according to Example 1 and Comparative Example 1.
Figure 5:
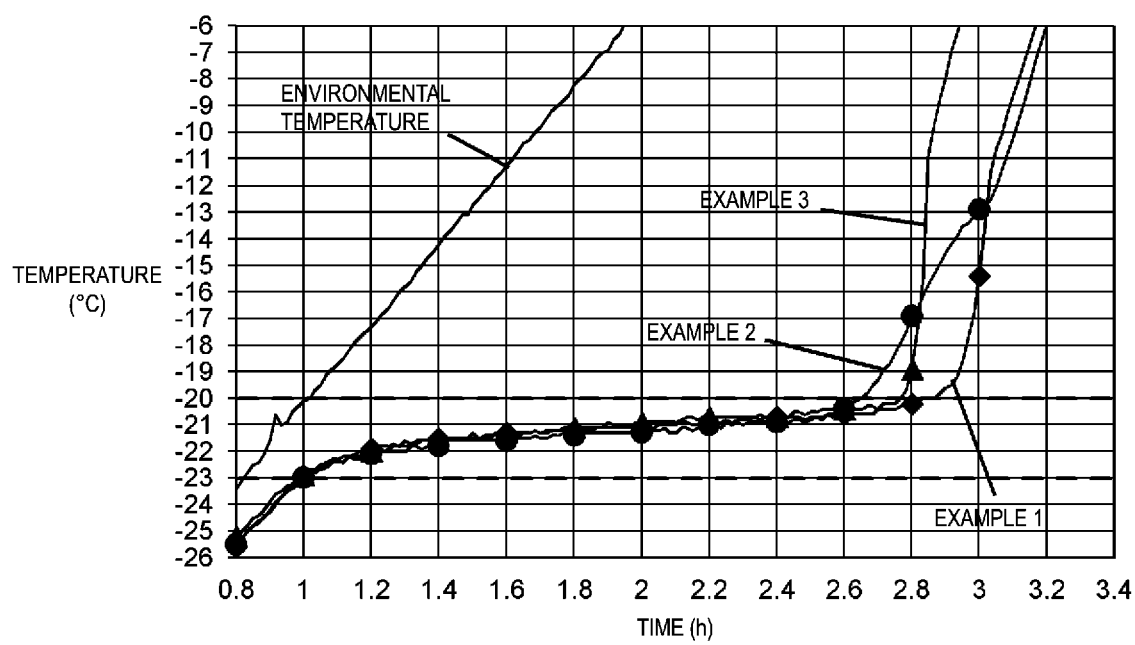
FIG. 5 is a diagram showing melting behaviors of the latent heat storage materials according to Examples 1, 2, and 3.
Figure 6:
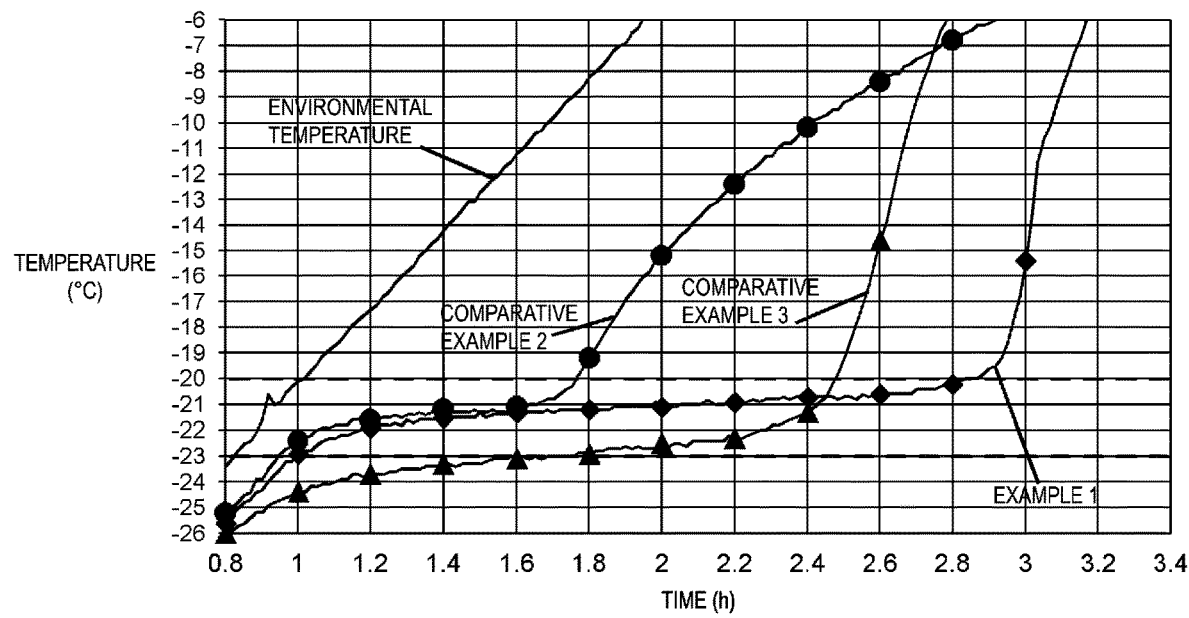
FIG. 6 is a diagram showing melting behaviors of the latent heat storage materials of Example 1 and Comparative Examples 2 and 3.
Figure 7:
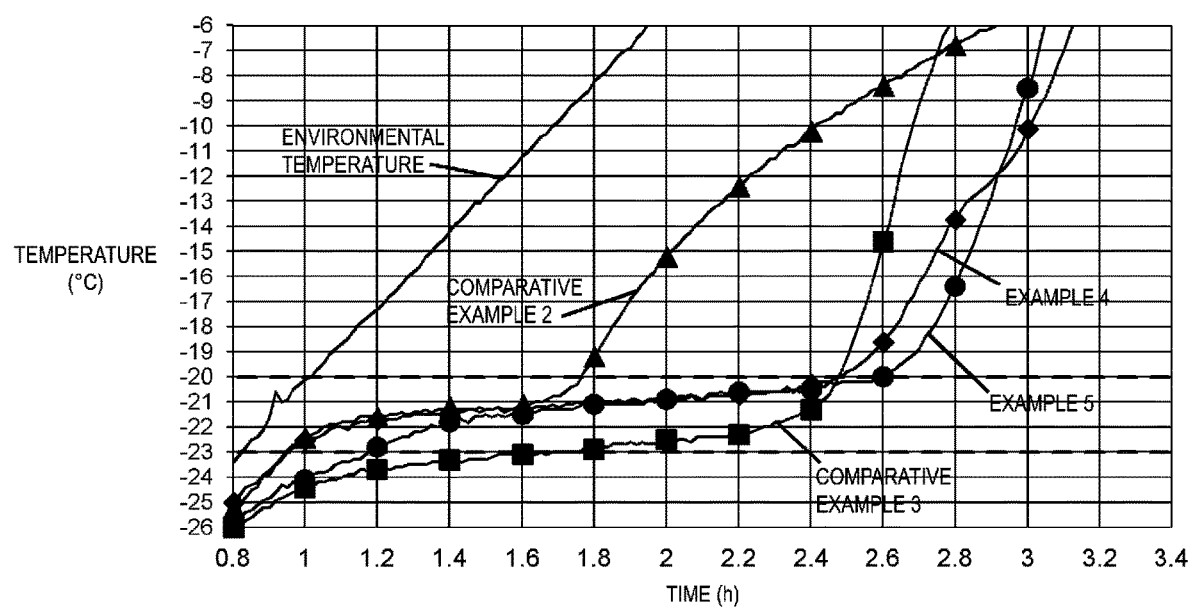
FIG. 7 is a diagram showing melting behaviors of the latent heat storage materials of Examples 4 and 5 and Comparative Examples 2 and 3.

The results of the melting characteristics of the latent heat storage materials of Example 1 and Comparative Example 1 are shown in FIG. 4, the results of the melting characteristics of the latent heat storage materials of Examples 1, 2 and 3 are shown in FIG. 5, the results of the melting characteristics of the latent heat storage materials of Example 1 and Comparative Examples 2 and 3 are shown in FIG. 6, and the results of the melting characteristics of the latent heat storage materials of Examples 4 and 5 and Comparative Example 1 are shown in FIG. 7. Note that the horizontal axis in FIGS. 4 to 7 indicates an elapsed time from a time at which the temperature starts rising from −35° C.

According to FIG. 4, the latent heat storage material of Example 1 completely melted after approximately 2.9 hours and the temperature thereof rapidly rose thereafter, whereas the latent heat storage material of Comparative Example 1 completely melted after approximately 2.6 hours and the temperature thereof rapidly rose thereafter, which indicates that the latent heat storage material of Comparative Example 1 melted within a shorter time period. The cold storage time period was approximately 1.9 hours in Example 1, and approximately 1.4 hours in Comparative Example 1. That is, the latent heat storage material of Example 1 has a composition containing 5 to 21 parts by weight of ammonium chloride, 2 to 13 parts by weight of potassium chloride, 5 to 23 parts by weight of urea, and 43 to 88 parts by weight of water, and the total amount of ammonium chloride, potassium chloride, urea, and water is 100 parts by weight. By adopting this composition, the latent heat storage material of Example 1 can achieve the longer cold storage time period than the latent heat storage material of Comparative Example 1.

From FIG. 5, it was found that the latent heat storage materials of Examples 2 and 3 each had a long cold storage time period equivalent to that of the latent heat storage material of Example 1. That is, when the latent heat storage material is a latent heat storage material composed of 12 to 15 parts by weight of ammonium chloride, 5 to 8 parts by weight of potassium chloride, 9 to 13 parts by weight of urea, and 64 to 74 parts by weight of water, which is within a desirable composition range, only the eutectic crystal is mostly formed at the time of solidification and a large amount of latent heat is obtained. Thus, cold storage can be performed for a long period of time.

As shown in FIG. 6, the latent heat storage material of Comparative Example 2 only managed to maintain a cold storage time period half or less that of the latent heat storage material of Example 1. With the latent heat storage material of Comparative Example 3, the main melting point was lower than −20° C. to −23° C., and the cold storage time period was short. That is, in the compositions outside the above-described range, the amount of latent heat is significantly reduced or the amount of latent heat is reduced, and the main melting point is lower than −20° C. to −23° C. Thus, the cold storage time period is significantly shortened, and the cold storage at −20° C. or lower becomes difficult.

According to FIG. 7, the latent heat storage material of Comparative Example 2 has an extremely short cold storage time period compared with the latent heat storage material of Example 4. This is likely because the concentrations of ammonium chloride and potassium chloride become extremely low, and thus the amount of eutectic crystal formed from ammonium chloride, potassium chloride, and ice is reduced, which results in lowering the latent heat value.

It can be seen that the latent heat storage material of Comparative Example 3 has a shorter cold storage time period than the latent heat storage material of Example 5. This is likely because an excessive amount of urea inhibits the formation of the eutectic crystal, which is formed from ammonium chloride, potassium chloride, and ice, and both the main melting point and the latent heat value are lowered as shown in FIG. 1. The main melting point being lowered means that a melting component having a temperature lower than a target cold storage temperature is generated at the time of solidification. Since the melting component having the lower temperature has a larger difference with the surrounding environmental temperature, the amount of heat absorbed per unit time becomes larger. As a result, the melting gets faster, and the cold storage time period is shortened. Thus, the main melting point of the latent heat storage material is preferably from −20° C. to −23° C.

For the reasons described above, the concentrations of ammonium chloride and urea in the latent heat storage material likely have an impact. That is, when the concentration deviates from the concentration range of 5 to 21 parts by weight of ammonium chloride, 2 to 13 parts by weight of potassium chloride, 5 to 23 parts by weight of urea, and 43 to 88 parts by weight of water, the cold storage time period at −20° C. to −23° C. is shortened. Due to this, for example, it becomes difficult to keep the object to be refrigerated, such as ice cream, at −20° C. or lower, and a sufficient cold storage effect may not be obtained. Thus, preferably, in the latent heat storage material, the concentration range is adjusted to the concentration range of 5 to 21 parts by weight of ammonium chloride, 2 to 13 parts by weight of potassium chloride, 5 to 23 parts by weight of urea, and 43 to 88 parts by weight of water.

The solidification characteristics of the latent heat storage materials according to Example 1 and Examples 6 to 10 were evaluated. A thermocouple was inserted into 40 g of each of the latent heat storage materials, and changes over time in the temperature at the time when each of the latent heat storage materials solidified were measured. Specifically, each of the latent heat storage materials was placed in a cold storage compartment at the environmental temperature of −25° C., and the environmental temperature was maintained at −25° C. to measure the changes over time in the temperature of the latent heat storage material at the time of solidification.

Figure 8:
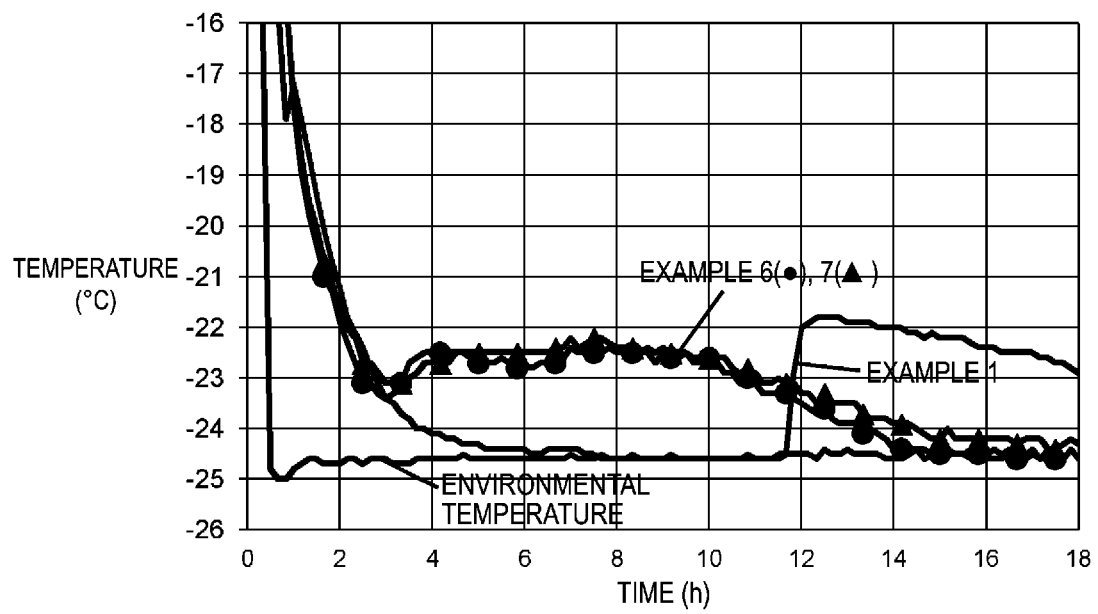
FIG. 8 is a diagram showing solidification behaviors of the latent heat storage materials according to Example 1 and Examples 6 and 7.
Figure 9:
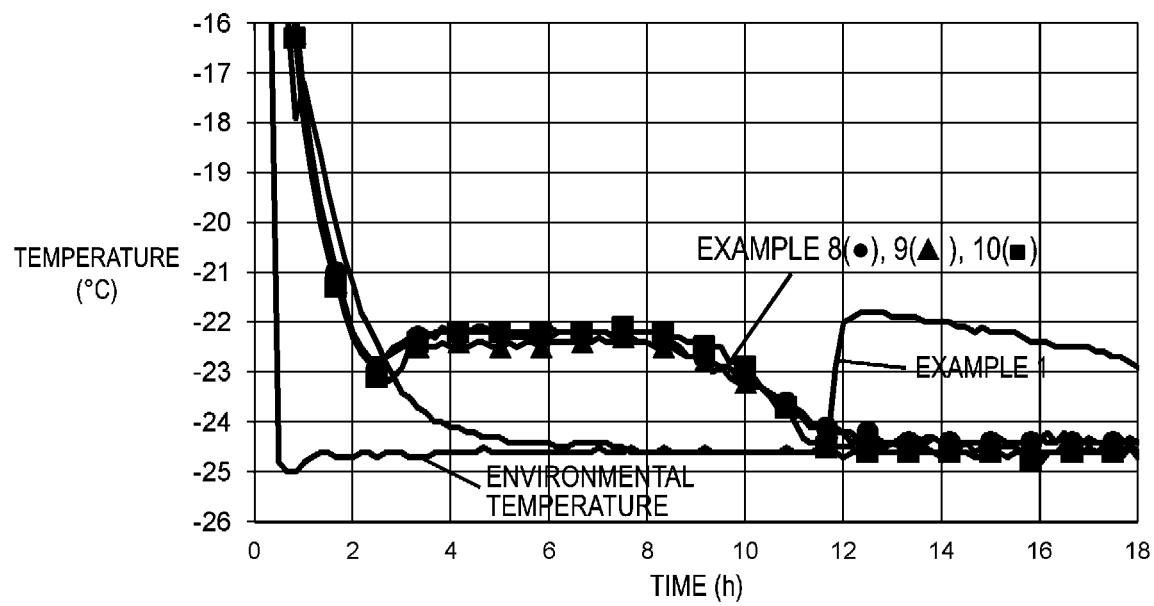
FIG. 9 is a diagram showing solidification behaviors of the latent heat storage materials according to Example 1 and Examples 8 to 10.

The results of the solidification characteristics of Example 1 and Examples 6 and 7 are shown in FIG. 8. The results of the solidification characteristics of Example 1 and Examples 8 to 10 are shown in FIG. 9.

According to FIGS. 8 and 9, with the latent heat storage material of Example 1, the supercooling ended after approximately 12 hours, which was later than for the other Examples, then, the solidification started, and heat generation derived from the solidification was observed. On the other hand, with the latent heat storage materials of Examples 6 to 10, to which the supercooling inhibitor was added, solidification started rapidly with almost no supercooling, and heat generation derived from the solidification was observed. In other words, by adding the supercooling inhibitor, the latent heat storage material can be caused to rapidly solidify even when it is cooled at −25° C., which is around −20° C. to −23° C. which is the range of the main melting point. In contrast to the latent heat storage material of Example 1, to which the supercooling inhibitor is not added, the latent heat storage materials of Examples 6 to 10 can achieve cold storage performance while saving energy.

2 Second Embodiment 2.1 Cold Storage Tool

Figure 10:
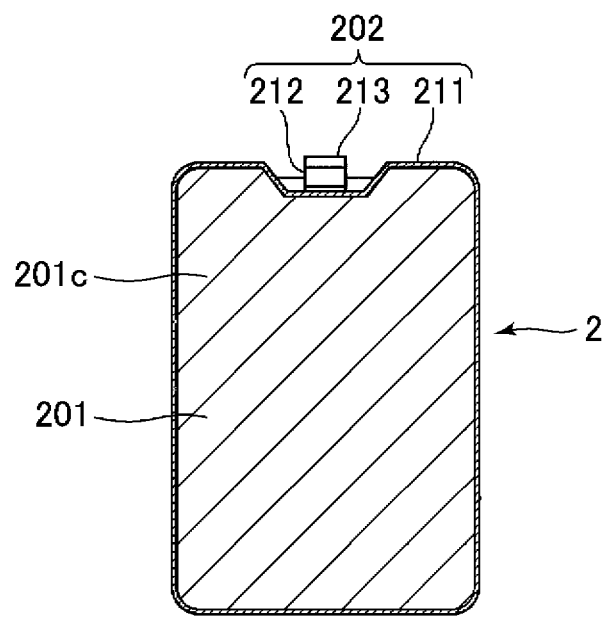
FIG. 10 is a vertical cross-sectional view schematically illustrating a cold storage tool according to a second embodiment.
Figure 11:
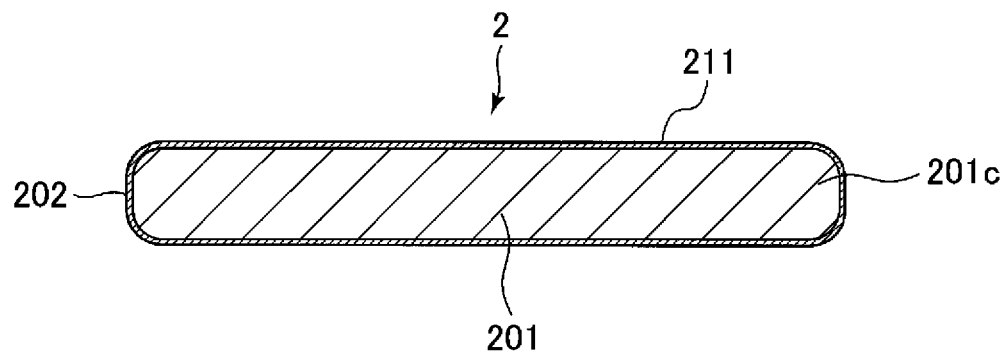
FIG. 11 is a lateral cross-sectional view schematically illustrating the cold storage tool according to the second embodiment.

FIG. 10 is a vertical cross-sectional view schematically illustrating a cold storage tool 2 according to a second embodiment. FIG. 11 is a lateral cross-sectional view schematically illustrating the cold storage tool 2 according to the second embodiment.

The cold storage tool 2 keeps the object to be refrigerated cold. The object to be refrigerated is, for example, ice cream that is kept at a temperature of −20° C. or lower. The cold storage tool 2 is a so-called blow container-type cold storage tool.

As illustrated in FIGS. 10 and 11, the cold storage tool 2 includes a latent heat storage material 201 and a cold storage tool main body 202.

The latent heat storage material 201 is the latent heat storage material according to the first embodiment.

The cold storage tool main body 202 stores the latent heat storage material 201 in a liquid-tight manner. The latent heat storage material 201 is stored in an internal space 201c formed in the cold storage tool main body 202.

As illustrated in FIGS. 10 and 11, the cold storage tool main body 202 includes a storage member 211, an injection port 212, and a sealing member 213.

The storage member 211 has a hollow structure. As a result, the internal space 201c, in which the latent heat storage material 201 is stored, is formed in the storage member 211.

The storage member 211 is preferably formed of a material having high rigidity. As a result, when the latent heat storage material 201 changes from a solid state to a liquid state, changes in the shape of the storage member 211 can be suppressed. As a result, the cold storage tool 2 is characterized by the fact that changes in the shape thereof are small when the latent heat storage material 201 changes from the solid state to the liquid state.

The material constituting the storage member 211 contains, for example, at least one selected from the group consisting of a resin material, a metal material, and an inorganic material. The resin material contains at least one selected from the group consisting of polyethylene, polypropylene, polyester, polyurethane, polycarbonate, polyvinyl chloride, and polyamide. The metal material contains at least one selected from the group consisting of aluminum, stainless steel, copper, and silver. The inorganic material contains at least one selected from the group consisting of glass, pottery, and ceramic. The material constituting the storage member 211 is preferably a resin material. As a result, ease of manufacturing and durability of the storage member 211 can be improved.

The injection port 212 is coupled to an upper portion of the storage member 211.

The sealing member 213 seals the injection port 212.

The cold storage tool 2 is brought close to or into contact with the object to be refrigerated. As a result, the object to be refrigerated can be kept cold at a temperature near the main melting point of the latent heat storage material 201.

2.2 Method for Manufacturing Cold Storage Tool

Figure 12A:
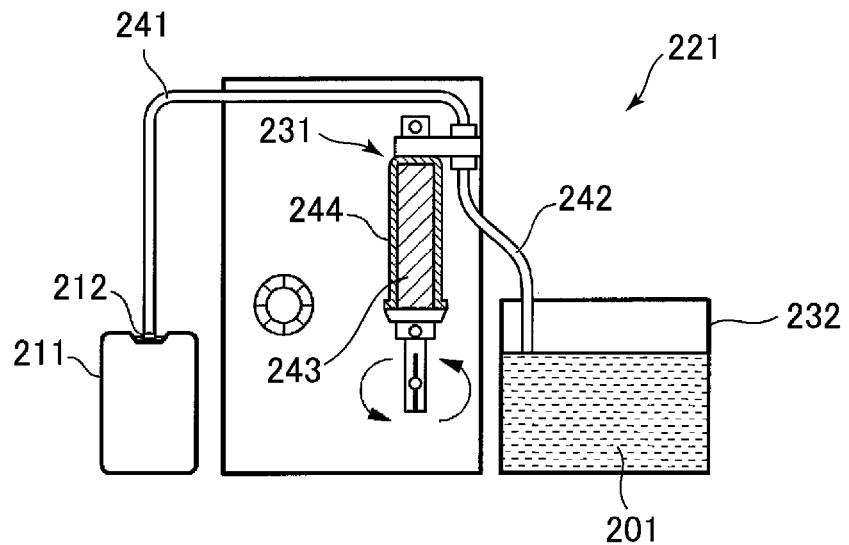
FIG. 12A is a diagram schematically illustrating a manufacturing apparatus used for manufacturing the cold storage tool according to the second embodiment.
Figure 12B:
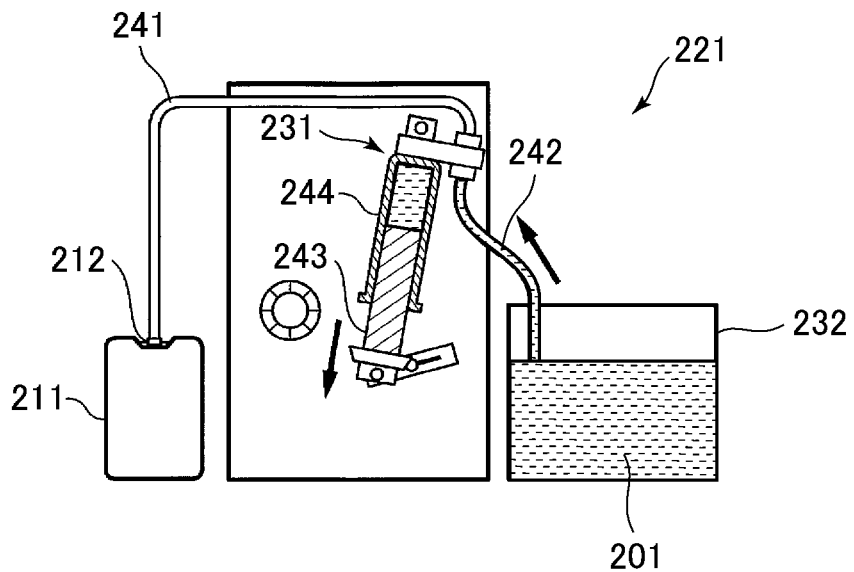
FIG. 12B is a diagram schematically illustrating the manufacturing apparatus used for manufacturing the cold storage tool according to the second embodiment.
Figure 12C:
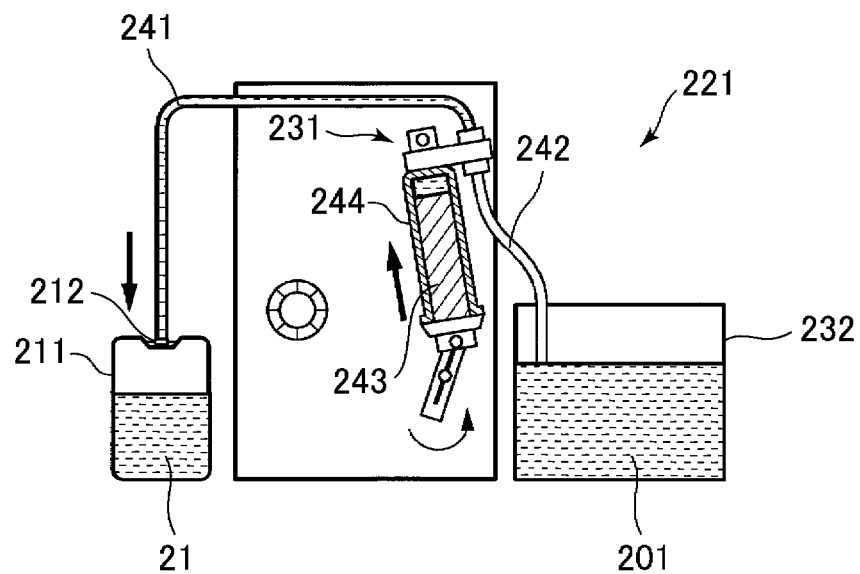
FIG. 12C is a diagram schematically illustrating the manufacturing apparatus used for manufacturing the cold storage tool according to the second embodiment.

FIGS. 12A to 12C schematically illustrate a manufacturing apparatus 221 used for manufacturing the cold storage tool 2 according to the second embodiment.

As illustrated in FIGS. 12A to 12C, when the cold storage tool 2 is manufactured, the latent heat storage material 201, which is a liquid, is injected into the storage member 211 via the injection port 212 by a cylinder pump 231. The latent heat storage material 201 may be injected into the storage member 211 using another method. For example, the latent heat storage material 201 may be injected into the storage member 211 by a mohno pump.

When the latent heat storage material 201 is injected into the storage member 211, as illustrated in FIG. 12A, the tip of a filling hose 241 of the cylinder pump 231 is connected to the injection port 212. The tip of a suction hose 242 of the cylinder pump 231 is put into the latent heat storage material 201.

Subsequently, as illustrated in FIG. 12B, a piston 243 of the cylinder pump 231 is lowered. As a result, the latent heat storage material 201 is sucked up. The sucked-up latent heat storage material 201 is sucked into the cylinder 244 of the cylinder pump 231 via the suction hose 242.

Subsequently, as illustrated in FIG. 12C, the piston 243 of the cylinder pump 231 is raised. As a result, the latent heat storage material 201 is discharged from the inside of a cylinder 244 of the cylinder pump 231. The discharged latent heat storage material 201 is injected into the storage member 211 via the filling hose 241. The injection amount of the latent heat storage material 201 is not limited, but is preferably from 70% to 90% of the internal volume of the storage member 211.

Subsequently, the injection port 212 is sealed by the sealing member 213. The sealing of the injection port 212 by the sealing member 213 is performed by welding the sealing member 213 to the injection port 212, for example. As a result, the injection port 212 is sealed by the sealing member 213. As a result, leakage of the latent heat storage material 201 from the storage member 211 can be suppressed. The sealing member 213 is welded to the injection port 212 by ultrasonic welding, thermal welding, or the like.

The sealing of the injection port 212 by the sealing member 213 may be performed by screwing the sealing member 213, as a screw plug, into the injection port 212. As a result, the sealing member 213 can be used as a plug that can be freely opened and closed by hand.

Subsequently, the cold storage tool 2 is placed in an environment having a temperature equal to or lower than the solidification temperature of the latent heat storage material 201. As a result, the latent heat storage material 201 solidifies.

In a case in which the cold storage tool 2 is stored in a distribution packing container, the latent heat storage material 201 is caused to solidify before the cold storage tool 2 is stored in the distribution packing container. However, in a case in which the temperature inside the distribution packing container can be set to a temperature equal to or lower than the solidification start temperature of the latent heat storage material 201 at the initial stage of the distribution process, the latent heat storage material 201 may be caused to solidify after the cold storage tool 2 is stored in the distribution packing container. As a result, use of the cold storage tool 2 can be started in a state in which the latent heat storage material 201 is in the liquid state.

3 Third Embodiment 3.1 Distribution Packing Container (Cold Storage Tool for Food)

Figure 13:
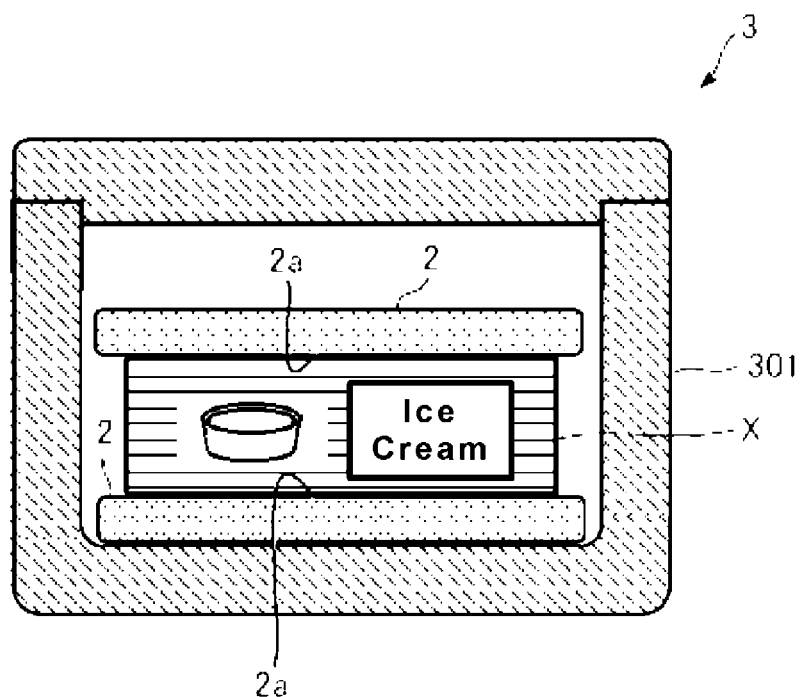
FIG. 13 is a cross-sectional view schematically illustrating a distribution packing container according to a third embodiment.

FIG. 13 is a cross-sectional view schematically illustrating a distribution packing container 3 according to a third embodiment.

The distribution packing container 3 keeps an object to be refrigerated X cold. The distribution packing container 3 is used for transporting the object to be refrigerated X in a refrigerated state. The object to be refrigerated X is, for example, the ice cream that is kept cold at the temperature of −20° C. or lower. When the object to be refrigerated X is the ice cream, the distribution packing container 3 is also a cold storage tool for food for keeping the ice cream cold.

As illustrated in FIG. 13, the distribution packing container 3 includes the cold storage tool 2 according to the second embodiment, and a distribution packing container main body 301.

The distribution packing container main body 301 stores the cold storage tool 2 and the object to be refrigerated X.

The cold storage tool 2 sandwiches the object to be refrigerated X from above and below. As a result, at least a part of the cold storage tool 2 comes into contact with the object to be refrigerated X. As a result, heat is conducted from the object to be refrigerated X to the cold storage tool 2 via a contact surface 2a between the object to be refrigerated X and the cold storage tool 2. As a result, the object to be refrigerated X can be effectively kept cold. The heat flowing into the distribution packing container 3 from the outside of the distribution packing container 3 can be suppressed from affecting the object to be refrigerated X. Thus, the cold storage tool 2 can keep the object to be refrigerated X cold at a temperature near the main melting point of the latent heat storage material 201. The distribution packing container 3 is suitably used for cold storage and transportation of the ice cream that is kept cold at the temperature of −20° C. or lower.

The distribution packing container 3 may include a heat insulating member disposed above the cold storage tool 2. As a result, the cold storage performance of the distribution packing container 3 can be improved.

The shape, number, posture in use, and the like of the cold storage tool 2 are changed in accordance with the shape, properties, and the like of the object to be refrigerated X.

4 Fourth Embodiment

4.1 Cold Storage Tool

Figure 14:
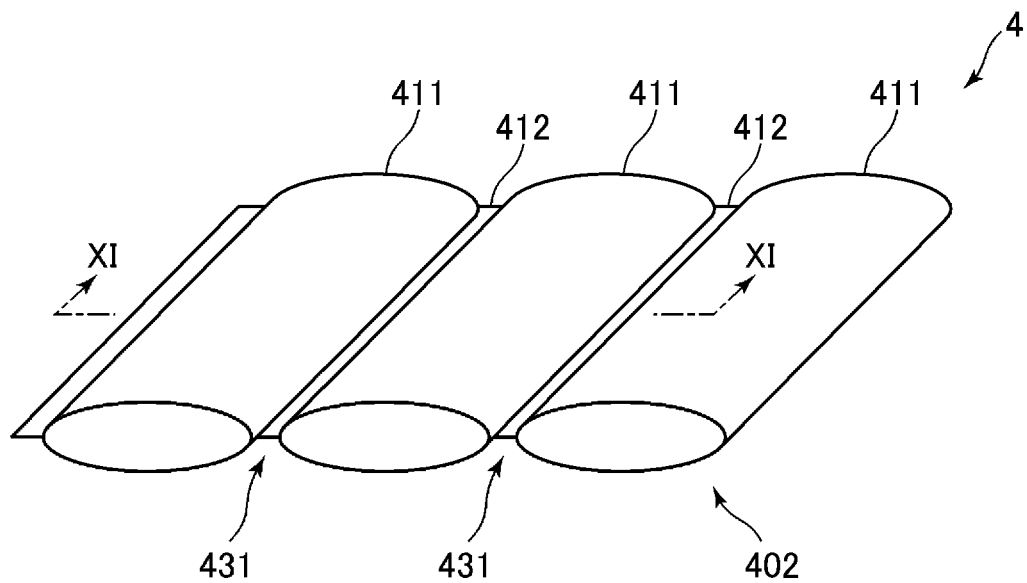
FIG. 14 is a perspective view schematically illustrating a cold storage tool according to a fourth embodiment.
Figure 15:
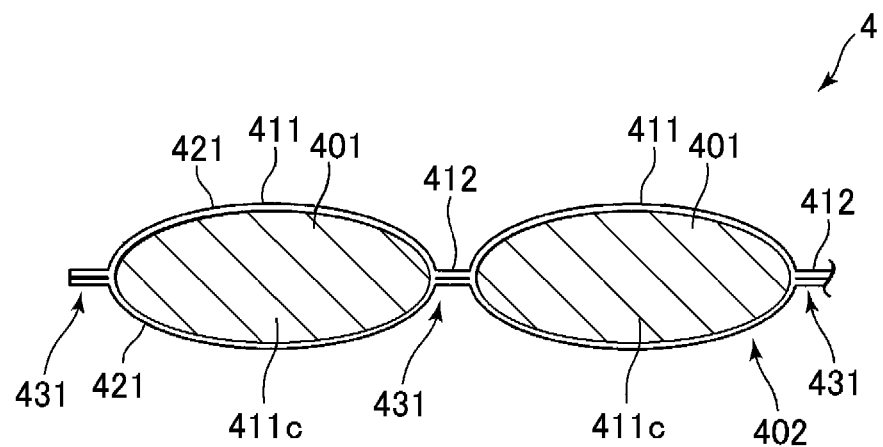
FIG. 15 is a cross-sectional view schematically illustrating the cold storage tool according to the fourth embodiment.

FIG. 14 is a perspective view schematically illustrating a cold storage tool 4 according to a fourth embodiment. FIG. 15 is a cross-sectional view schematically illustrating the cold storage tool 4 according to the fourth embodiment. FIG. 15 illustrates a cross-section taken along a section line XI-XI depicted in FIG. 14.

The cold storage tool 4 is a so-called film pack-type cold storage tool.

As illustrated in FIGS. 14 and 15, the cold storage tool 4 includes a latent heat storage material 401 and a cold storage tool main body 402.

The latent heat storage material 401 is the latent heat storage material according to the first embodiment.

As illustrated in FIGS. 14 and 15, the cold storage tool main body 402 includes a plurality of storage portions 411 and a plurality of joint portions 412.

Each of the plurality of storage portions 411 stores the latent heat storage material 401 in the liquid-tight manner. The latent heat storage material 401 is stored in an internal space 411c formed in each of the plurality of storage portions 411.

Each of the plurality of storage portions 411 has a strip-like planar shape and an elliptical cross-sectional shape. Each of the plurality of storage portions 411 may have a planar shape other than the strip-like planar shape, and may have a cross-sectional shape other than the elliptical cross-sectional shape.

The cold storage tool main body 402 includes three of the storage portions 411. The number of the storage portions 411 provided in the cold storage tool main body 402 may be increased or decreased. The number of the storage portions 411 provided in the cold storage tool main body 402 is increased or decreased according to the size of the object to be refrigerated. As a result, the size of the cold storage tool 4 can be changed in accordance with the size of the object to be refrigerated.

The latent heat storage material 401 may be one type of the latent heat storage material, or may be two or more types of the latent heat storage materials having mutually different melting points. When two or more types of the latent heat storage materials having mutually different melting points are stored in the plurality of storage portions 411, a plurality of the objects to be kept cold at mutually different cold storage temperatures can be kept cold at the same time.

Each of the plurality of joint portions 412 couples two of the adjacent storage portions 411 included in the plurality of storage portions 411. Each of the plurality of joint portions 412 has a joint function of allowing the two storage portions 411 to be movable. As a result of the cold storage tool 4 including the plurality of joint portions 412, even in a state in which the latent heat storage material 401 is in the solid state, the cold storage tool 4 can be given a shape conforming to the shape of the object to be refrigerated. As a result, even when the object to be refrigerated has a complex shape, the cold storage tool 4 can be brought into contact with the object to be refrigerated over a wide range. As a result, even when the object to be refrigerated has a complex shape, the object to be refrigerated can be effectively kept cold.

As illustrated in FIG. 15, the cold storage tool main body 402 includes two film members 421. The two film members 421 are bonded to each other at a plurality of bonding portions 431 to constitute the plurality of joint portions 412, and are not bonded to each other at remaining portions thereof to constitute the plurality of storage portions 411.

The film member 421 is formed of a material that can suppress leakage and volatilization of the latent heat storage material 401. The film members 421 are formed of a material that can be bonded together. The film member 421 is formed of a material having flexibility that can impart the joint function to the plurality of joint portions 412.

The material constituting the film member 421 contains, for example, at least one selected from the group consisting of polyethylene, polypropylene, polyamide, and polyester. The material constituting the film member 421 may be one type of material, or a combination of two or more types of materials.

The film member 421 may be a single-layer film or a multilayer film. The film member 421 is preferably a multilayer film including a low-density polyethylene resin layer and a polyamide resin layer. When the film member 421 is the multilayer film, the two film members 421 are layered so that the two low-density polyethylene resin layers respectively included in the two film members 421 are in contact with each other. Contact surfaces of the two low-density polyethylene resin layers are thermally pressure-bonded to each other. As a result, the plurality of joint portions 412 can be formed.

The film member 421 may include a substrate and a thin film disposed on the substrate. The material constituting the thin film contains, for example, at least one selected from the group consisting of aluminum and silicon dioxide. As a result, durability and the barrier property of the film member 421 can be improved.

The cold storage tool 4 may include a temperature indicating material sticker that is attached to the film member 421 and indicates the temperature. As a result, the temperature of the cold storage tool 4 can be identified.

The cold storage tool 4 may have a so-called pack-in-pack structure. When the cold storage tool 4 has the pack-in-pack structure, the cold storage tool 4 includes a film for wrapping the film member 421. This improves the physical strength, texture, and heat insulating property of the cold storage tool 4.

The cold storage tool 4 may be fixed to the object to be refrigerated by being attached to a fixing jig for fixing the cold storage tool 4 to the object to be refrigerated. The fixing jig is, for example, a supporter, a towel, a bandage, or the like.

4.2 Method for Manufacturing Cold Storage Tool

Figure 16:
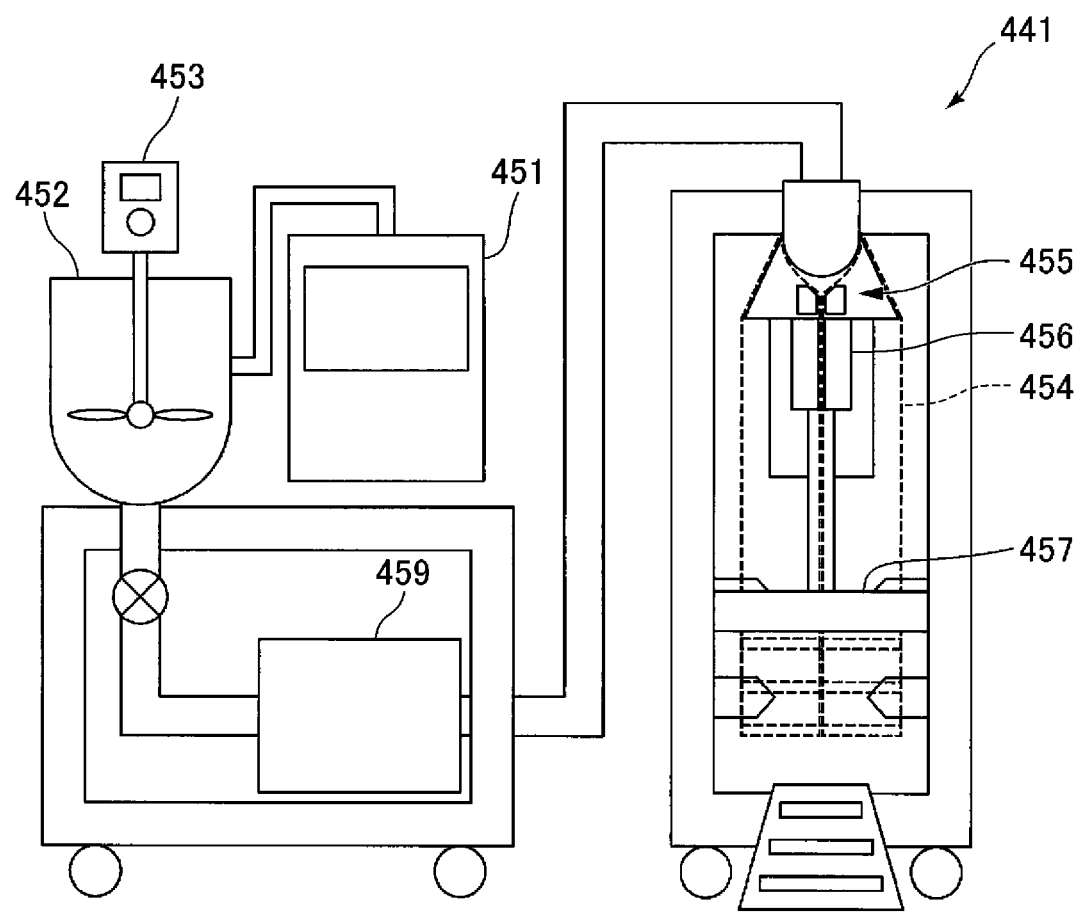
FIG. 16 is a diagram schematically illustrating a manufacturing apparatus used for manufacturing the cold storage tool according to the fourth embodiment.

FIG. 16 is a diagram schematically illustrating a manufacturing apparatus 441 used for manufacturing the cold storage tool 4 according to the fourth embodiment.

The manufacturing apparatus 441 is a so-called vertical pillow-type packaging machine, which is also used for packaging food.

As illustrated in FIG. 16, when the cold storage tool 4 is manufactured, the latent heat storage material 401 stored in a thermostatic tank 451 is transported to a mixing tank 452.

Subsequently, the latent heat storage material 401 transported to the mixing tank 452 is mixed by a mixer 453.

Subsequently, two sheets of films 454 are fed from a film roll (not illustrated).

Subsequently, both ends, of the fed two sheets of the films 454, extending in the long axis direction are joined to each other by a former unit 455.

Subsequently, both ends of the two sheets of the films 454 that have been joined to each other are thermally pressure-bonded to each other by a vertical sealing unit 456. As a result, a cylindrical object is formed by the two sheets of the films 454.

Subsequently, the two sheets of the films 454 constituting the cylindrical object are thermally pressure-bonded to each other by a lateral sealing unit 457 along pressure-bonding lines extending in the short axis direction of the two sheets of the films 454.

Subsequently, a pump 459 is operated. As a result, the mixed latent heat storage material 401 is injected into the cylindrical object constituted by the two sheets of the films 454.

Subsequently, the two sheets of the films 454 constituting the cylindrical object are thermally pressure-bonded to each other once again along the pressure-bonding lines extending in the short axis direction of the two sheets of the films 454 by the lateral seal portion 457. As a result, the storage portions 411 and the joint portions 412 are formed. The latent heat storage material 401 is stored in the formed storage portion 411.

5 Fifth Embodiment

5.1 Distribution Packing Container (Cold Storage Tool for Food)

Figure 17:
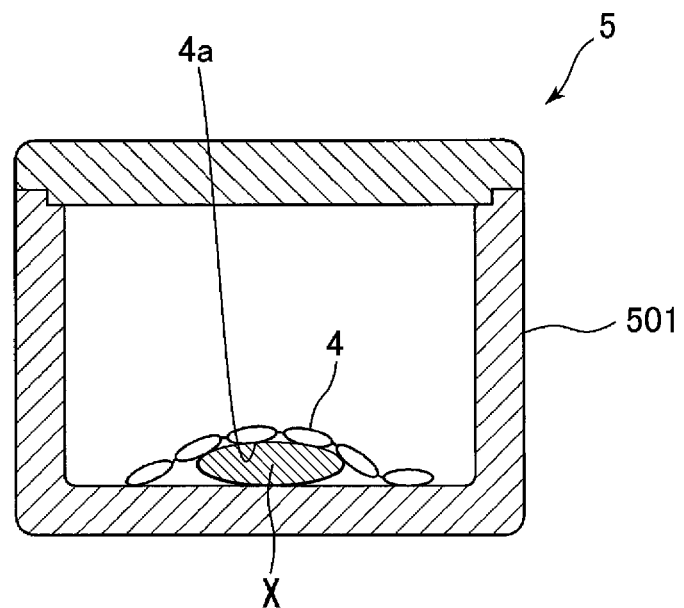
FIG. 17 is a cross-sectional view schematically illustrating a distribution packing container according to a fifth embodiment.

FIG. 17 is a cross-sectional view schematically illustrating a distribution packing container 5 according to a fifth embodiment.

The distribution packing container 5 keeps the object to be refrigerated X cold. The distribution packing container 5 is used for transporting the object to be refrigerated X in a refrigerated state. The object to be refrigerated X is, for example, the ice cream that is kept cold at the temperature of −20° C. or lower. When the object to be refrigerated X is the ice cream, the distribution packing container 5 is also a cold storage tool for food for keeping the ice cream cold.

As illustrated in FIG. 17, the distribution packing container 5 includes the cold storage tool 4 according to the fourth embodiment, and a distribution packing container main body 501.

The distribution packing container main body 501 stores the cold storage tool 4 and the object to be refrigerated X.

The cold storage tool 4 covers the object to be refrigerated X from above. As a result, at least a part of the cold storage tool 4 comes into contact with the object to be refrigerated X. As a result, heat is conducted from the object to be refrigerated X to the cold storage tool 4 via a contact surface 4a between the object to be refrigerated X and the cold storage tool 4. As a result, the object to be refrigerated X can be effectively kept cold. The heat flowing into the distribution packing container 5 from the outside of the distribution packing container 5 can be suppressed from affecting the object to be refrigerated X. Thus, the cold storage tool 4 can keep the object to be refrigerated X at a temperature near the main melting point of the latent heat storage material 401. Thus, the cold storage tool 4 is suitably used for cold storage and transportation of the ice cream that is kept cold at the temperature of −20° C. or lower.

The shape, number, posture in use, and the like of the cold storage tool 4 are changed according to the shape, properties, and the like of the object to be refrigerated X.

5.2 Modified Example

Figure 18:
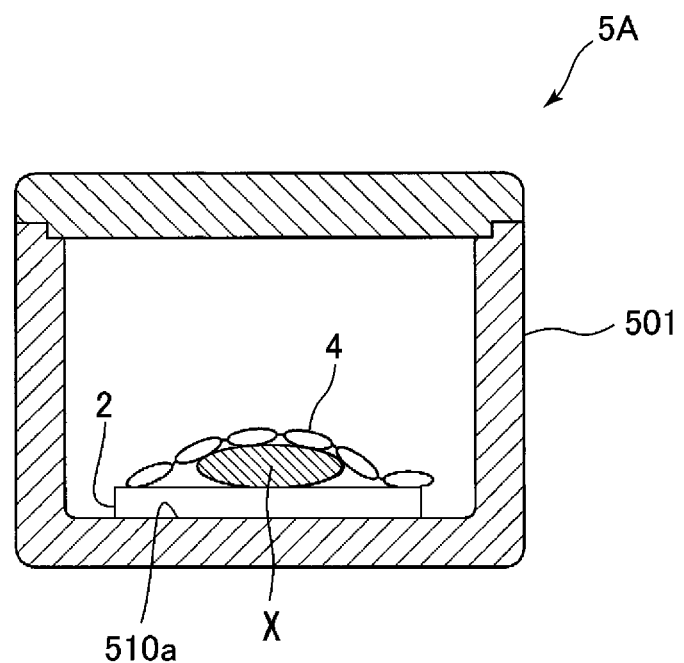
FIG. 18 is a cross-sectional view schematically illustrating a distribution packing container according to a modified example of the fifth embodiment.

FIG. 18 is a cross-sectional view schematically illustrating a distribution packing container 5A according to a modified example of the fifth embodiment.

The distribution packing container 5A is different from the distribution packing container 5 in that the distribution packing container 5A further includes the cold storage tool 2 according to the second embodiment in addition to the cold storage tool 4 according to the fourth embodiment. The cold storage tool 2 is disposed between the object to be refrigerated X and a bottom surface 510a of the distribution packing container main body 501. As a result, heat from flowing into the object to be refrigerated X through the bottom surface 510a of the distribution packing container main body 501 can be suppressed.

As described above, the cold storage tool 2 is characterized by the fact that the changes in the shape thereof are small when the latent heat storage material 201 changes from the solid state to the liquid state. Thus, in the distribution packing container 5A, the object to be refrigerated X can be stably disposed on the cold storage tool 2.

6. Sixth Embodiment

6.1 Cold Storage Tool

Figure 19:
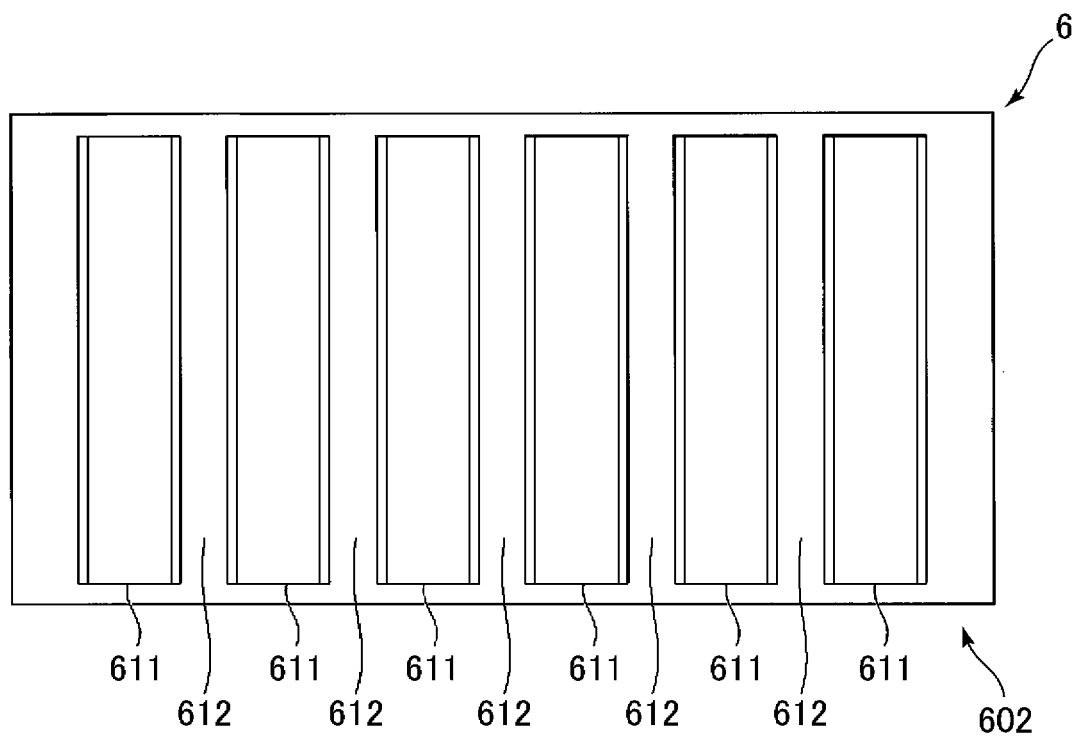
FIG. 19 is a plan view schematically illustrating a cold storage tool according to a sixth embodiment.
Figure 20:
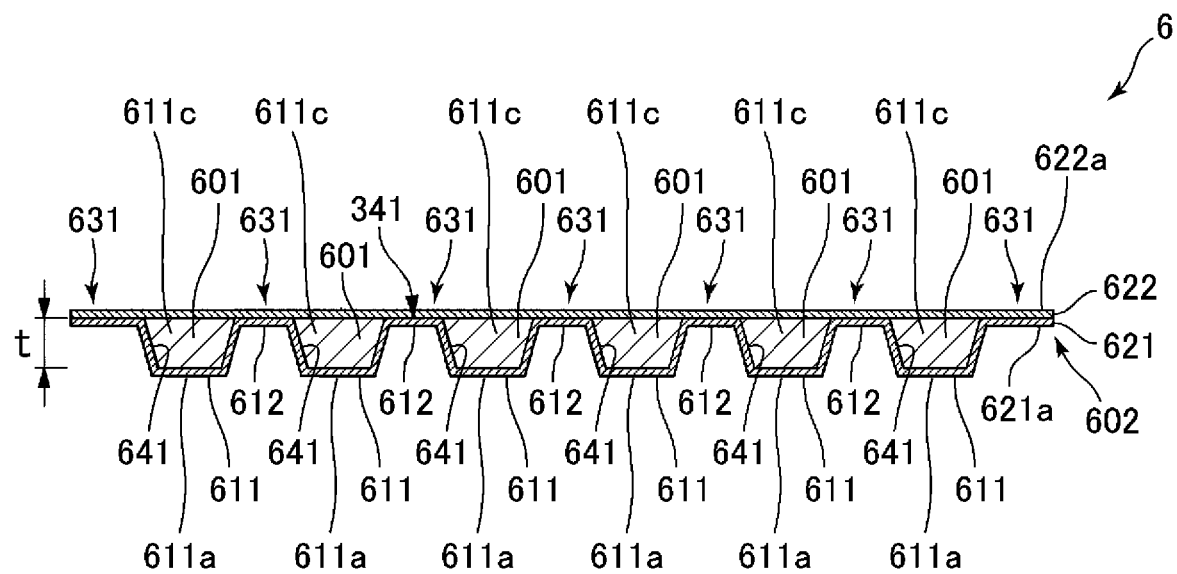
FIG. 20 is a cross-sectional view schematically illustrating the cold storage tool according to the sixth embodiment.

FIG. 19 is a plan view schematically illustrating a cold storage tool 6 according to a sixth embodiment. FIG. 20 is a cross-sectional view schematically illustrating the cold storage tool 6 according to the sixth embodiment.

The cold storage tool 6 is a so-called blister pack type cold storage tool.

As illustrated in FIGS. 19 and 20, the cold storage tool 6 includes a latent heat storage material 601 and a cold storage tool main body 602.

The latent heat storage material 601 is the latent heat storage material of the first embodiment.

As illustrated in FIGS. 19 and 20, a cold storage tool main body 602 includes a plurality of storage portions 611 and a plurality of joint portions 612.

Each of the plurality of storage portions 611 stores a latent heat storage material 601 in the liquid-tight manner. The latent heat storage material 601 is stored in an internal space 611c formed in each of the plurality of storage portions 611.

Each of the plurality of storage portions 611 has a strip-like planar shape and a trapezoidal cross-sectional shape. Each of the plurality of storage portions 611 may have a planar shape other than the strip-like planar shape, and may have a cross-sectional shape other than the trapezoidal cross-sectional shape.

A cold storage tool main body 602 includes six of the storage portions 611. The number of the storage portions 611 provided in the cold storage tool main body 602 may be increased or decreased. The number of the storage portions 611 provided in the cold storage tool main body 602 is changed according to the size of the object to be refrigerated. As a result, the size of the cold storage tool 6 can be changed in accordance with the size of the object to be refrigerated.

The latent heat storage material 601 may be one type of the latent heat storage material, or may be two or more types of the latent heat storage materials having mutually different melting points. When two or more types of the latent heat storage materials having mutually different melting points are stored in the plurality of storage portions 611, a plurality of the objects to be kept cold at mutually different cold storage temperatures can be kept cold at the same time.

When the object to be refrigerated has a can-like shape, a contact surface 611a of the storage portion 611 may be a concave curved surface having a shape conforming to a convex curved surface of the object to be refrigerated. When the object to be refrigerated has a tapered shape, the thickness of the storage portion 611 may be changed along the longitudinal direction of the storage portion 611.

Each of the plurality of joint portions 612 couples two of the adjacent storage portions 611 included in the plurality of storage portions 611. Each of the plurality of joint portions 612 has a joint function of allowing the two storage portions 611 to be movable. Since the cold storage tool 6 includes the plurality of joint portions 612, even when the latent heat storage material 601 is in the solid state, the cold storage tool 6 can be given a shape conforming to the shape of the object to be refrigerated. As a result, even when the object to be refrigerated has a complex shape, the cold storage tool 6 can be brought into contact with the object to be refrigerated over a wide range. As a result, even when the object to be refrigerated has a complex shape, the object to be refrigerated can be effectively kept cold.

As illustrated in FIG. 20, the cold storage tool main body 602 includes a storage member 621 and a sealing member 622. The storage member 621 and the sealing member 622 are bonded to each other at a plurality of bonding portions 631 to constitute the plurality of joint portions 612, and are not bonded to each other at remaining portions thereof to constitute the plurality of storage portions 611.

As illustrated in FIGS. 19 and 20, the storage member 621 includes a plurality of recessed portions 641. The sealing member 622 has a flat plate shape. The plurality of recessed portions 641 constitute the plurality of storage portions 611 together with the sealing member 622.

The storage member 621 is formed of a material having a hardness that can maintain the shape of the recessed portion 641. The storage member 621 and the sealing member 622 are formed of a material that can suppress leakage and volatilization of the latent heat storage material 601. The storage member 621 and the sealing member 622 are formed of materials that can be bonded to each other. The storage member 621 and the sealing member 622 are formed of materials having flexibility that can impart the joint function to the plurality of joint portions 612.

The material constituting the storage member 621 contains, for example, at least one selected from the group consisting of polyethylene, polypropylene, polyamide, polyester, polycarbonate, and polyvinyl chloride. The material constituting the storage member 621 may be one type of material, or may be a combination of two or more types of materials.

The storage member 621 preferably has a thickness of from 100 μm to 1000 μm. As a result, flexibility can be imparted to the storage member 621. As a result, the joint function can be imparted to the plurality of joint portions 612.

The material constituting the sealing member 622 contains, for example, at least one selected from the group consisting of polyethylene, polypropylene, polyamide, and polyester. The material constituting the sealing member 622 may be one type of material, or may be a combination of two or more types of materials.

The sealing member 622 preferably has a thickness of from approximately 50 μm to 100 μm. As a result, flexibility can be imparted to the sealing member 622. As a result, the joint function can be imparted to the plurality of joint portions 612.

The storage member 621 and the sealing member 622 may be single-layer members or multilayer members. The storage member 621 and the sealing member 622 are preferably multilayer members each including a low-density polyethylene resin layer and a polyamide resin layer. When the storage member 621 and the sealing member 622 are the multilayer members, the storage member 621 and the sealing member 622 are layered so that the two low-density polyethylene resin layers respectively included in the storage member 621 and the sealing member 622 are in contact with each other. Contact surfaces of the two low-density polyethylene resin layers are thermally pressure-bonded to each other. As a result, the plurality of joint portions 612 can be formed.

At least one of the storage member 621 and the sealing member 622 may include a substrate and a thin film disposed on the substrate. The material constituting the thin film contains, for example, at least one selected from the group consisting of aluminum and silicon dioxide. As a result, durability and the barrier property of the member can be improved.

The cold storage tool 6 may include a temperature indicating material sticker that is attached to at least one of the storage member 621 and the sealing member 622 and indicates the temperature. Thus, the temperature of the cold storage tool 6 can be identified.

The storage member 621 and the sealing member 622 may include a fixing portion for maintaining the shape of the cold storage tool 6 in a cylindrical shape. As a result, when the cold storage tool 6 is brought close to or into contact with the object to be refrigerated, the object to be refrigerated can be surrounded by the cold storage tool 6. The fixing portion includes, for example, hook-and-loop fasteners provided at a front surface 621a of the storage member 621 and a front surface 622a of the sealing member 622.

6.2 Modified Example

Figure 21:
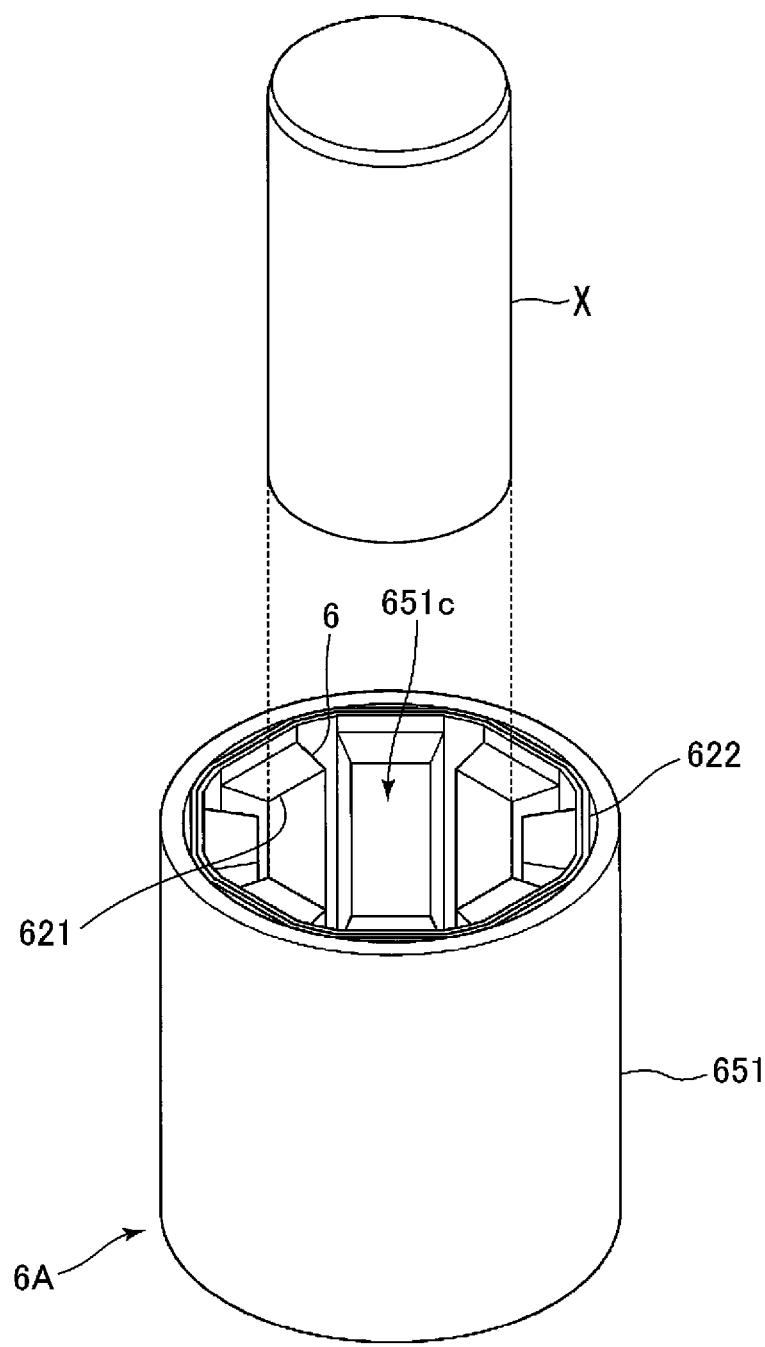
FIG. 21 is a perspective view schematically illustrating a cold storage tool according to a modified example of the sixth embodiment.
Figure 22:
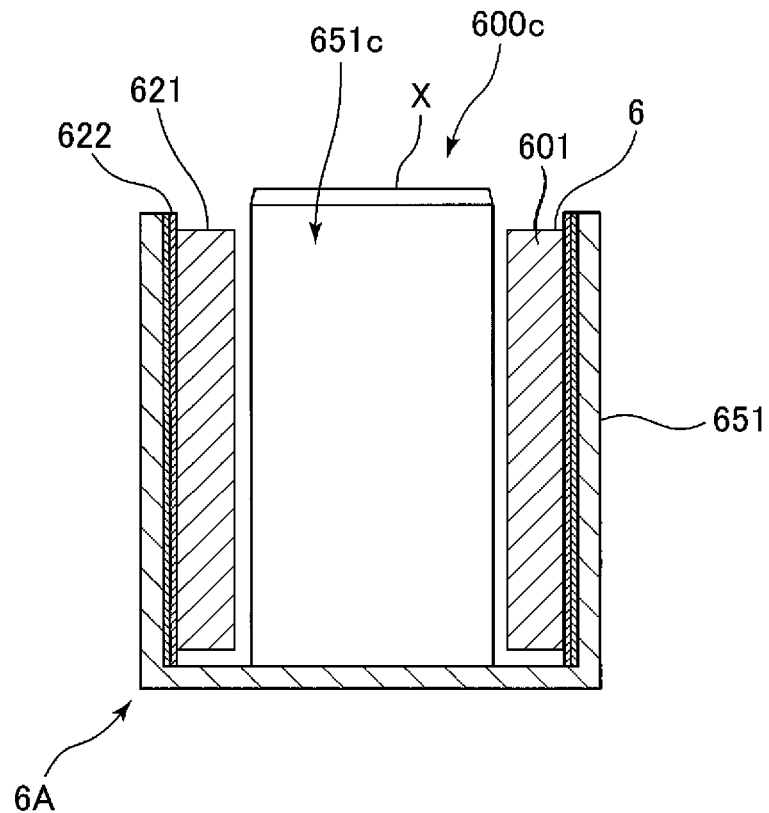
FIG. 22 is a cross-sectional view schematically illustrating the cold storage tool according to the modified example of the sixth embodiment.

FIG. 21 is a perspective view schematically illustrating a cold storage tool 6A according to a modified example of the sixth embodiment. FIG. 22 is a cross-sectional view schematically illustrating the cold storage tool 6A according to the modified example of the sixth embodiment.

The cold storage tool 6A is different from the cold storage tool 6 in that the cold storage tool 6A includes a cold storage tool support body 651.

The cold storage tool support body 651 has a bottomed cylindrical shape. One end of the cold storage tool support body 651 is open. An internal space 651c that stores the cold storage tool 6 is formed in the cold storage tool support body 651. The cold storage tool 6 is deformed so that the storage member 621 is disposed on the radially inner side, and the sealing member 622 is disposed on the radially outer side. Since the cold storage tool 6A includes the cold storage tool support body 651, the cold storage tool 6A has the cylindrical shape and can stand by itself.

The cold storage tool support body 651 is preferably formed of a material having thermal insulation properties and capable of inhibiting heat exchange between the exterior of the cold storage tool support body 651 and the interior of the cold storage tool support body 651.

The material constituting the cold storage tool support body 651 contains, for example, at least one selected from the group consisting of foamed polyethylene, foamed urethane, and chloroprene rubber (foamed rubber).

As illustrated in FIG. 22, in a state in which the cold storage tool 6A is being used, the object to be refrigerated X having a can-like shape or a bottle-like shape is inserted into a cylindrical space 600c surrounded by the cold storage tool support body 651. As a result, the cold storage tool 6 can be brought close to or in contact with the object to be refrigerated X. As a result, the object to be refrigerated X can be kept cold at a temperature near the main melting point of the latent heat storage material 601.

The cold storage tool support body 651 is preferably formed of an elastic material. As a result, the cold storage tool support body 651 can be elastically deformed according to the diameter of the object to be refrigerated X. As a result, the cold storage tool support body 651 can be pressed against the object to be refrigerated X.

6.3 Method for Manufacturing Cold Storage Tool

FIGS. 23A to 23D are cross-sectional views schematically illustrating an intermediate product obtained when the cold storage tool 6 according to the sixth embodiment is manufactured.

Figure 23A:
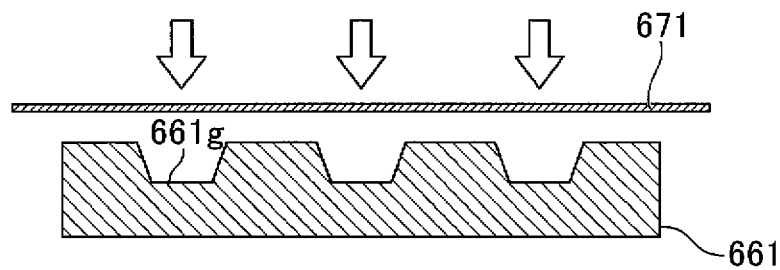
FIG. 23A is a cross-sectional view schematically illustrating an intermediate product obtained when the cold storage tool according to the sixth embodiment is manufactured.

When the cold storage tool 6 is manufactured, as illustrated in FIG. 23A, a hard film 671 serving as a precursor of the storage member 621 is placed on a mold 661 in which groove portions 661g each having a trapezoidal cross-sectional shape are formed.

Figure 23B:
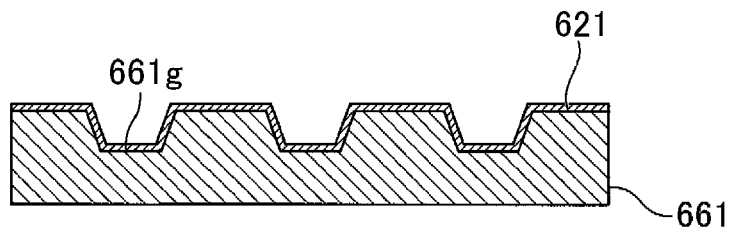
FIG. 23B is a cross-sectional view schematically illustrating the intermediate product obtained when the cold storage tool according to the sixth embodiment is manufactured.

Subsequently, as illustrated in FIG. 23B, the shapes of the groove portions 661g formed in the mold 661 are transferred to the hard film 671 by vacuum molding, pressing, or the like. As a result, the storage member 621 is formed.

Figure 23C:
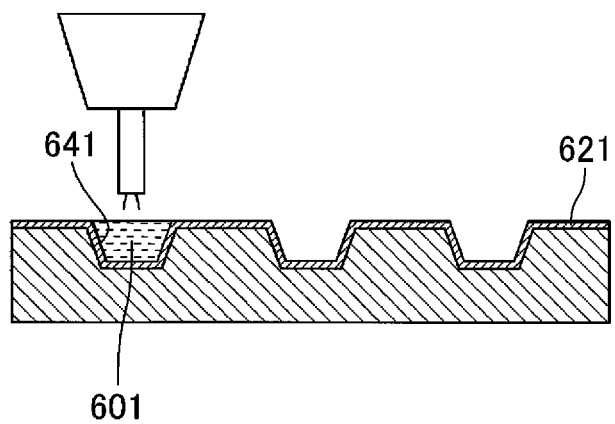
FIG. 23C is a cross-sectional view schematically illustrating the intermediate product obtained when the cold storage tool according to the sixth embodiment is manufactured.

Subsequently, as illustrated in FIG. 23C, the latent heat storage material 601, which is in the liquid state, is injected into the recessed portion 641 of the storage member 621 by a pump or the like.

Figure 23D:
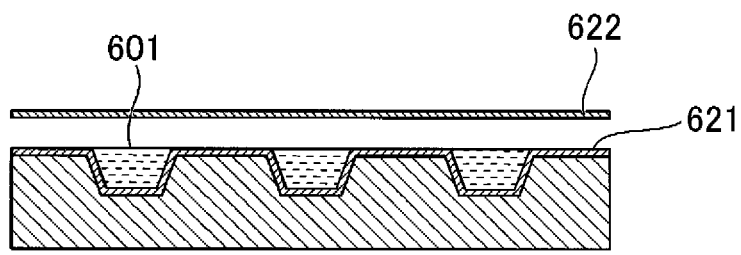
FIG. 23D is a cross-sectional view schematically illustrating the intermediate product obtained when the cold storage tool according to the sixth embodiment is manufactured.

Subsequently, as illustrated in FIG. 23D, the sealing member 622 is placed on the storage member 621. Contact surfaces of the storage member 621 and the sealing member 622 are thermally pressure-bonded to each other to form the storage portions 611 and the joint portions 612.

7 Seventh Embodiment 7.1 Distribution Packing Container (Cold Storage Tool for Food)

Figure 24:
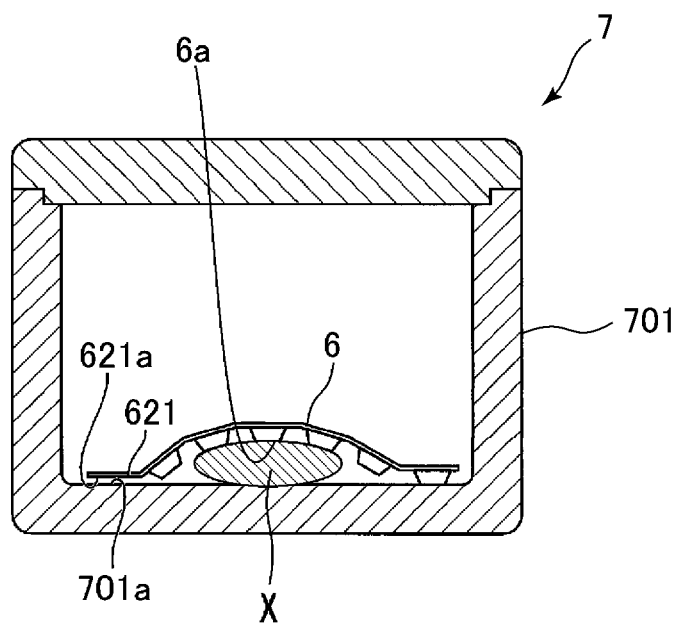
FIG. 24 is a cross-sectional view schematically illustrating a distribution packing container according to a seventh embodiment.

FIG. 24 is a cross-sectional view schematically illustrating a distribution packing container 7 according to a seventh embodiment.

The distribution packing container 7 keeps the object to be refrigerated X cold. The distribution packing container 7 is used for transporting the object to be refrigerated X in the refrigerated state. The object to be refrigerated X is, for example, ice cream that is kept cold at the temperature of −20° C. or lower. When the object to be refrigerated X is the ice cream, the distribution packing container 7 is also a cold storage tool for food for keeping the ice cream cold.

As illustrated in FIG. 24, the distribution packing container 7 includes the cold storage tool 6 according to the sixth embodiment and a distribution packing container main body 701.

The distribution packing container main body 701 stores the cold storage tool 6 and the object to be refrigerated X.

The cold storage tool 6 covers the object to be refrigerated X from above. As a result, at least a part of the cold storage tool 6 comes into contact with the object to be refrigerated X. As a result, heat is conducted from the object to be refrigerated X to the cold storage tool 6 via a contact surface 6a between the object to be refrigerated X and the cold storage tool 6. As a result, the object to be refrigerated X can be effectively kept cold. The heat flowing into the distribution packing container 7 from the outside of the distribution packing container 7 can be suppressed from affecting the object to be refrigerated X. Thus, the cold storage tool 6 can keep cold the object to be refrigerated X at a temperature near the main melting point of the latent heat storage material 601. Thus, the cold storage tool 6 is suitably used for cold storage and transportation of the ice cream that is required to be maintained at the temperature of −20° C. or less.

The distribution packing container 7 may include a heat insulating member disposed above the cold storage tool 6. As a result, the cold storage performance of the distribution packing container 7 can be improved.

In the distribution packing container 7, the front surface 621a of the storage member 621 and a bottom surface 701a of the distribution packing container main body 701 may be fixed to each other by a hook-and-loop fastener or the like.

The present disclosure is not limited to the above-described embodiments, and can be replaced by substantially the same configuration, a configuration that achieves substantially the same operation and effect, or a configuration that can achieve the same object as that of the above-described embodiment.

The invention claimed is:

1. A latent heat storage material, comprising:
   5 to 21 parts by weight of ammonium chloride;
   2 to 13 parts by weight of potassium chloride;
   5 to 23 parts by weight of urea; and
   43 to 88 parts by weight of water,
   wherein a total of the ammonium chloride, the potassium chloride, the urea, and the water is 100 parts by weight, and
   the latent heat storage material has a main melting point in a range from −20° C. to −23° C.

2. The latent heat storage material according to claim 1, comprising:
   12 to 15 parts by weight of the ammonium chloride;
   5 to 8 parts by weight of the potassium chloride;
   9 to 13 parts by weight of the urea, and
   64 to 74 parts by weight of the water.

3. The latent heat storage material according to claim 1, further comprising:
   a supercooling inhibitor.

4. The latent heat storage material according to claim 3, wherein the supercooling inhibitor contains at least one selected from the group consisting of ammonium aluminum sulfate dodecahydrate, potassium aluminum sulfate dodecahydrate, calcium carbonate, aluminum oxide, and activated carbon.

5. A cold storage tool, comprising:
   the latent heat storage material according to claim 1; and
   a cold storage tool main body configured to store the latent heat storage material in a liquid-tight manner.

6. The cold storage tool according to claim 5, wherein the cold storage tool main body includes a plurality of storage portions and a joint portion, the joint portion joining two adjacent storage portions, to each other, of the plurality of storage portions, and
   each of the plurality of storage portions stores the latent heat storage material in a liquid-tight manner.

7. A distribution packing container, comprising the cold storage tool according to claim 5.

8. A cold storage tool for food, comprising the cold storage tool according to claim 5.

* * * * *